(12) United States Patent
Ross et al.

(10) Patent No.: US 12,168,508 B2
(45) Date of Patent: Dec. 17, 2024

(54) TILTING HEXROTOR AIRCRAFT

(71) Applicant: Bell Textron Inc., Fort Worth, TX (US)

(72) Inventors: Brent C. Ross, Flower Mound, TX (US); Kirk L. Groninga, Keller, TX (US); Steven R. Ivans, Ponder, TX (US); Steve R. Schafer, Fort Worth, TX (US); Brad Joseph Passe, Irving, TX (US); Nicholas Ralph Carlson, Dallas, TX (US)

(73) Assignee: Textron Innovations Inc., Providence, RI (US)

( * ) Notice: Subject to any disclaimer, the term of this patent is extended or adjusted under 35 U.S.C. 154(b) by 192 days.

(21) Appl. No.: 17/216,591

(22) Filed: Mar. 29, 2021

(65) Prior Publication Data
US 2022/0306292 A1    Sep. 29, 2022

(51) Int. Cl.
*B64C 29/00* (2006.01)
*B64C 39/04* (2006.01)
(Continued)

(52) U.S. Cl.
CPC .......... *B64C 29/0033* (2013.01); *B64C 29/00* (2013.01); *B64C 39/04* (2013.01); *B64C 39/08* (2013.01); *B64D 27/24* (2013.01)

(58) Field of Classification Search
CPC ..... B64C 29/0033; B64C 39/04; B64C 3/385; B64C 27/30; B64C 39/08;
(Continued)

(56) References Cited

U.S. PATENT DOCUMENTS 8,485,464 B2 * 7/2013 Kroo ................... B64C 29/00
                                                    244/6
8,708,273 B2    4/2014 Oliver
(Continued)

FOREIGN PATENT DOCUMENTS

EP        4105124 A1    12/2002
WO    2020060839 A1     3/2020

OTHER PUBLICATIONS

The Vertical Flight Society, The Electric VTOL News™ "Powering the Future of Aviation," 2021 © Joby Aviation, Santa Cruz, CA, USA, 17 pages; https://evtol.news/joby-s4.

*Primary Examiner* — Richard Green
*Assistant Examiner* — Steven J Shur
(74) *Attorney, Agent, or Firm* — Akona IP PC

(57) ABSTRACT

One embodiment is an aircraft including a fuselage; a wing connected to the fuselage; first and second booms connected to the wing on opposite sides of the fuselage; first and second forward propulsion systems attached to forward ends of the first and second booms; first and second aft propulsion systems fixedly attached proximate aft ends of the first and second booms; first and second wing-mounted propulsion systems connected to outboard ends of wings; and first and second wing tips fixedly connected to outboard sides of the first and second wing-mounted propulsion systems; wherein the first and second wing-mounted propulsion systems and the first and second wing tips are collectively tiltable between a first position when the aircraft is in a hover mode and a second position when the aircraft is in a cruise mode.

19 Claims, 18 Drawing Sheets

(51) Int. Cl.
 *B64C 39/08* (2006.01)
 *B64D 27/24* (2024.01)
(58) Field of Classification Search
 CPC . B64C 2001/0045; B64C 39/12; B64D 27/02; B64D 27/24
 See application file for complete search history.

(56) References Cited

U.S. PATENT DOCUMENTS

| | | | | |
|---|---|---|---|---|
| 9,120,560 | B1* | 9/2015 | Armer | B64C 29/0025 |
| 9,751,625 | B2 | 9/2017 | Phan et al. | |
| 10,183,744 | B2* | 1/2019 | Gamble | B64C 27/30 |
| 10,501,173 | B1* | 12/2019 | Douglas | B64C 39/024 |
| 10,894,599 | B1* | 1/2021 | Popiks | B64C 11/00 |
| 10,994,829 | B2* | 5/2021 | Duffy | B64C 29/0025 |
| 11,136,115 | B2 | 10/2021 | Fenny et al. | |
| 11,174,019 | B2* | 11/2021 | Moore | G05D 1/0858 |
| 11,279,478 | B2 | 3/2022 | Fenny et al. | |
| 2013/0092799 | A1 | 4/2013 | Tian et al. | |
| 2014/0158815 | A1* | 6/2014 | Renteria | B64C 39/04 244/12.1 |
| 2015/0136897 | A1* | 5/2015 | Seibel | B64C 29/0033 244/6 |
| 2016/0236774 | A1* | 8/2016 | Niedzballa | B64C 27/30 |
| 2017/0240274 | A1 | 8/2017 | Regev | |
| 2020/0148347 | A1* | 5/2020 | Bevirt | B64D 27/24 |
| 2020/0354046 | A1 | 11/2020 | Knoll et al. | |
| 2020/0354048 | A1 | 11/2020 | Melo et al. | |
| 2020/0398983 | A1* | 12/2020 | Singh | B64C 39/024 |
| 2021/0107620 | A1 | 4/2021 | Weekes et al. | |
| 2021/0107640 | A1* | 4/2021 | Baity | B64C 29/0033 |
| 2021/0206483 | A1* | 7/2021 | Lee | B64C 29/0033 |
| 2021/0253234 | A1* | 8/2021 | Tao | B64C 29/0025 |
| 2022/0009626 | A1* | 1/2022 | Baharav | B64C 39/04 |

* cited by examiner

TILTING HEXROTOR AIRCRAFT

TECHNICAL FIELD

This disclosure relates in general to the field of tiltrotor aircraft and, more particularly, though not exclusively, to tilting hexrotor arrangements for such aircraft.

BACKGROUND

An electric vertical takeoff and landing (eVTOL) is a type of aircraft that uses electric power to supply rotational energy through electric motor(s) to props, rotors, or fans in an aircraft propulsion system for enabling the aircraft to hover, take off, and land vertically. Because of their versatility and lack of a need for a runway, eVTOLs are particularly useful for providing urban air mobility. As used herein, the term eVTOL also includes VTOLs that use hybrid electric (with an engine running a generator producing electricity and battery stored power) or turbo electric (an engine running a generator providing all power required) propulsion systems. One particular type of eVTOL is an electric tiltrotor aircraft.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

Figure 1A:
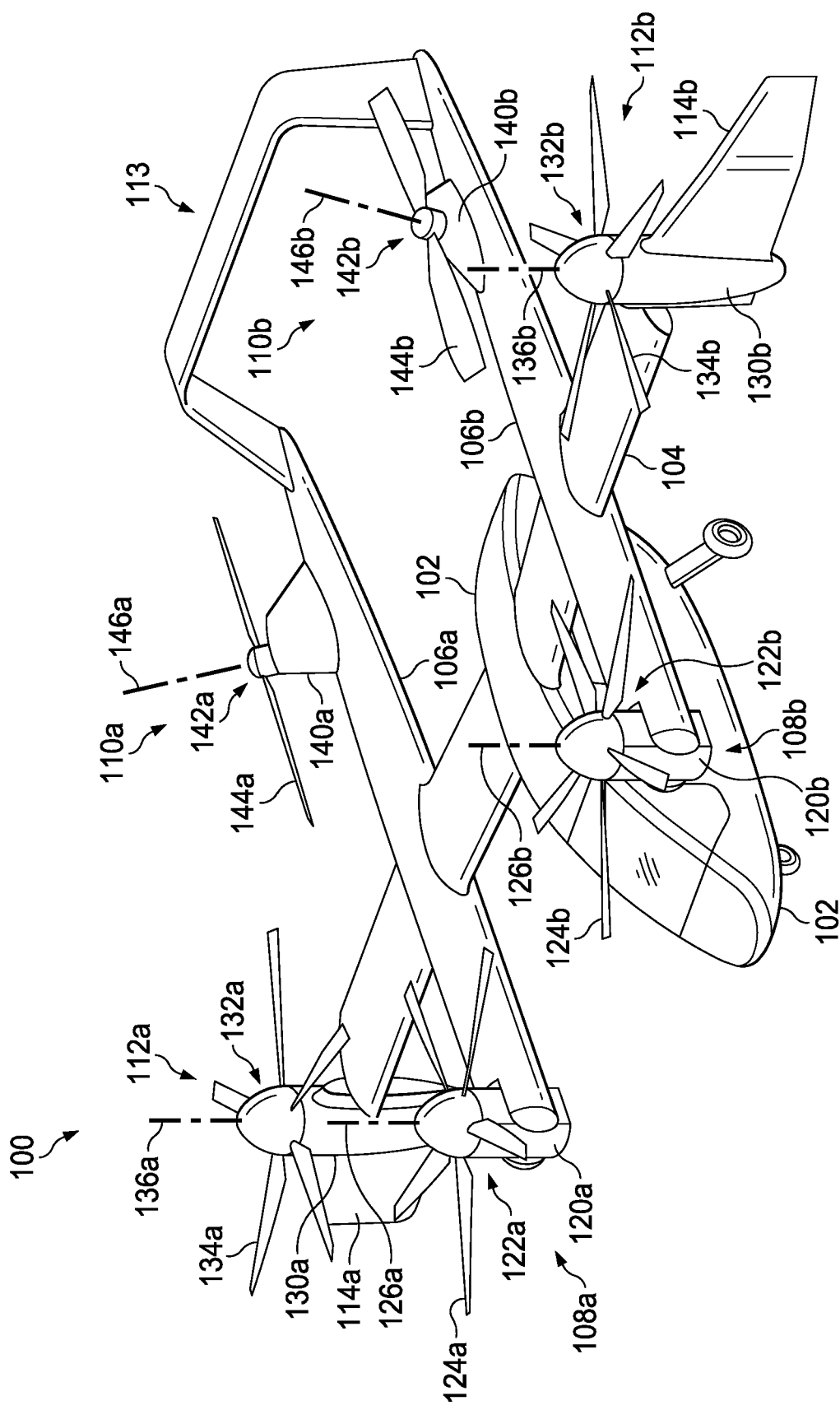
FIGS. 1A-1B illustrate a tiltrotor aircraft having a tilting hexrotor configuration in accordance with embodiments described herein.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Additionally, as referred to herein in this Specification, the terms "forward", "aft", "inboard", and "outboard" may be used to describe relative relationship(s) between components and/or spatial orientation of aspect(s) of a component or components. The term "forward" may refer to a spatial direction that is closer to a front of an aircraft relative to another component or component aspect(s). The term "aft" may refer to a spatial direction that is closer to a rear of an aircraft relative to another component or component aspect(s). The term "inboard" may refer to a location of a component that is within the fuselage of an aircraft and/or a spatial direction that is closer to or along a centerline of the aircraft (wherein the centerline runs between the front and the rear of the aircraft) or other point of reference relative to another component or component aspect. The term "outboard" may refer to a location of a component that is outside the fuselage of an aircraft and/or a spatial direction that farther from the centerline of the aircraft or other point of reference relative to another component or component aspect.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Described herein are various configurations for hexrotor aircraft. In accordance with features of embodiments described herein, the drive system includes one or more fixed electric motors coupled to an off-axis tilting gearbox.

The tilting configuration may have a motor attached to a drive system for reduction of rpm or the motor itself may be direct drive directly turning the prop at the desired speed. Tilting of the rotor assemblies can take place with respect to the stationary motors and wing or other stationary structure of the aircraft. The motors or motors with drive may tilt with the rotors/props or the motor may remain stationary with the prop and a portion of the drive rotating. Tilting may occur with a portion of the attached wing or boom or the wing or boom may stay fixed with only the pylon tilting.

Figure 3A:
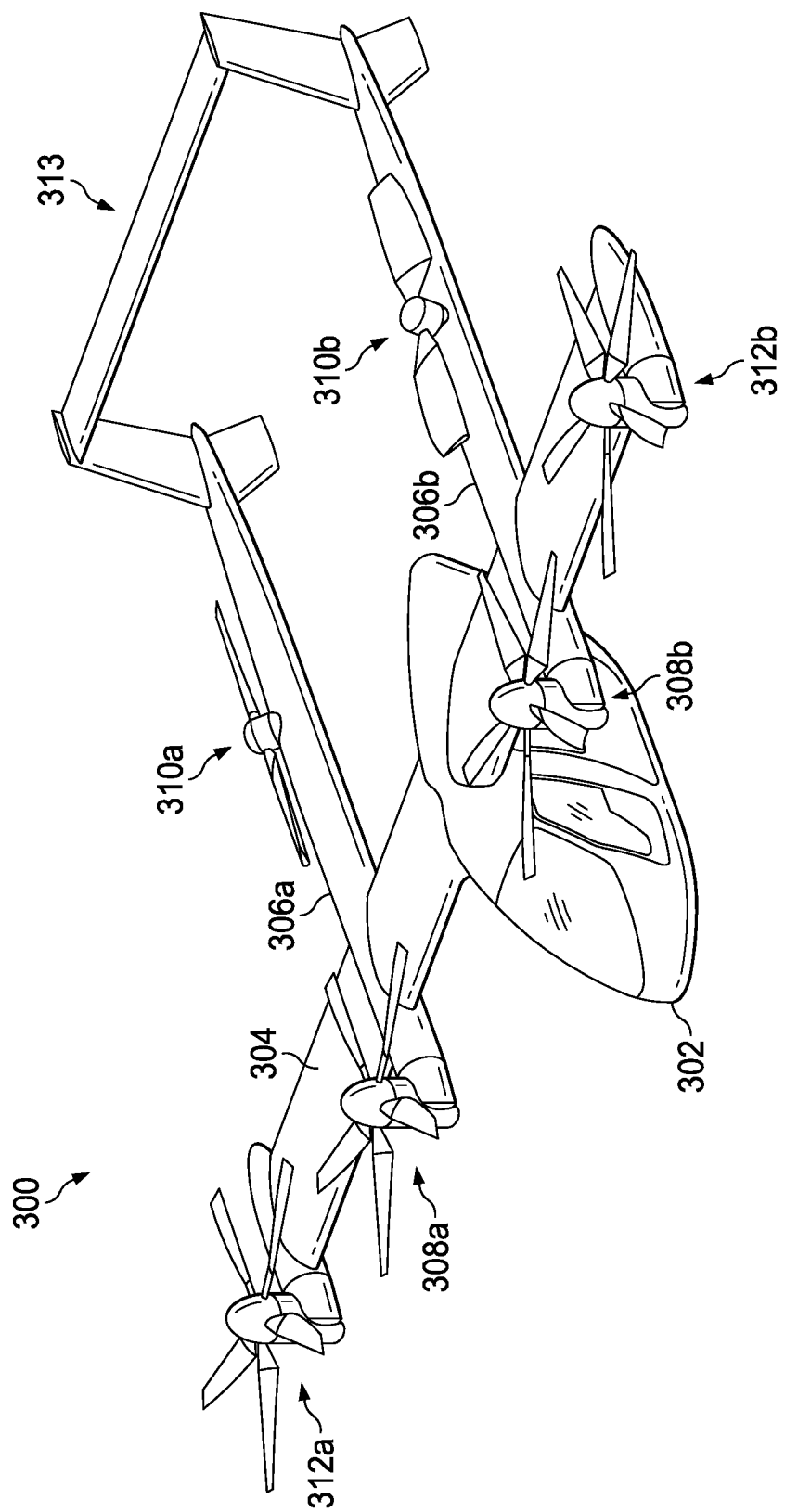
FIGS. 3A-3B illustrate another tiltrotor aircraft having a tilting hexrotor configuration in accordance with alternative embodiments described herein.
Figure 4A:
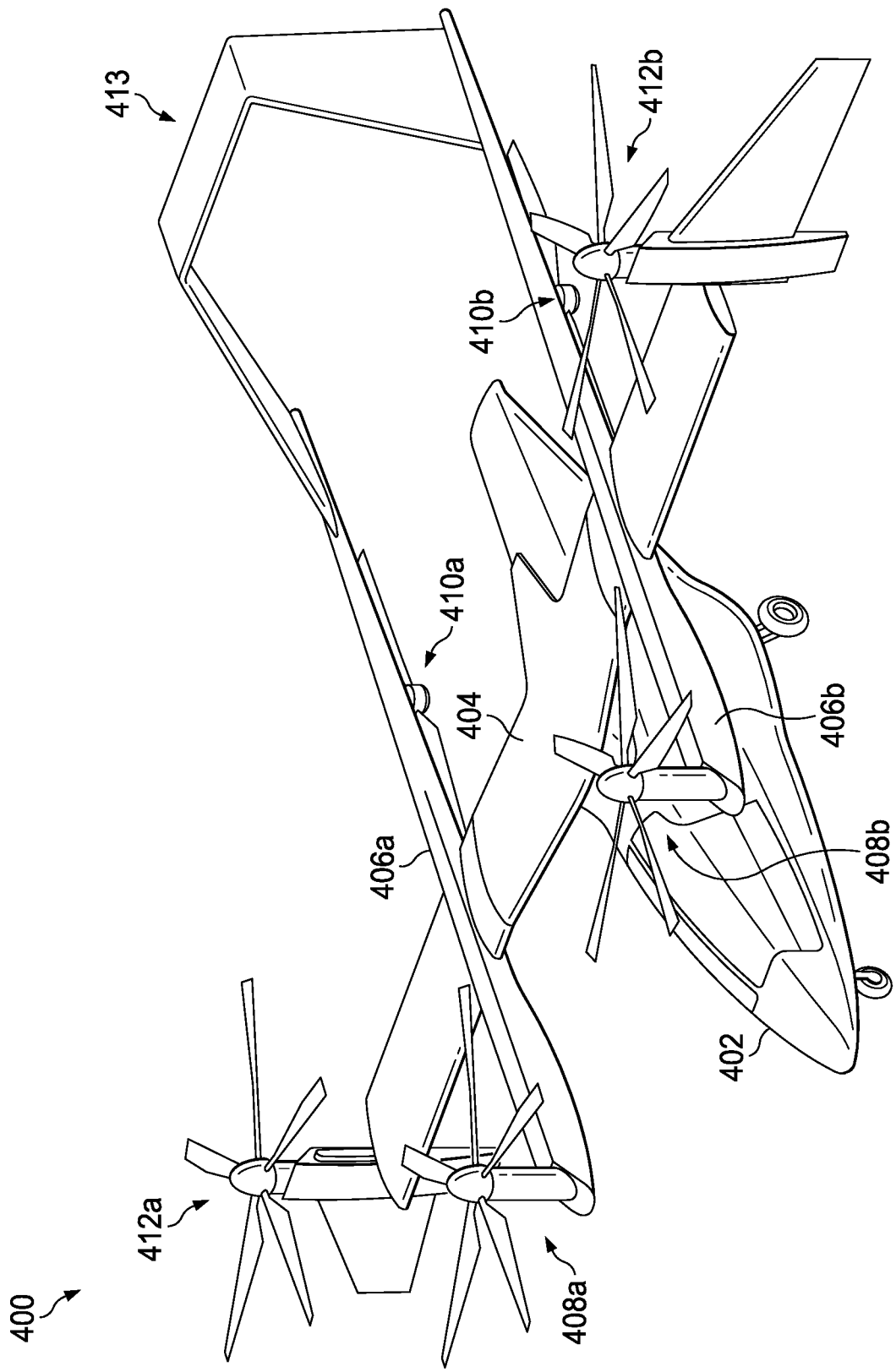
FIGS. 4A-4B illustrate another tiltrotor aircraft having a tilting hexrotor configuration in accordance with alternative embodiments described herein.
Figure 5A:
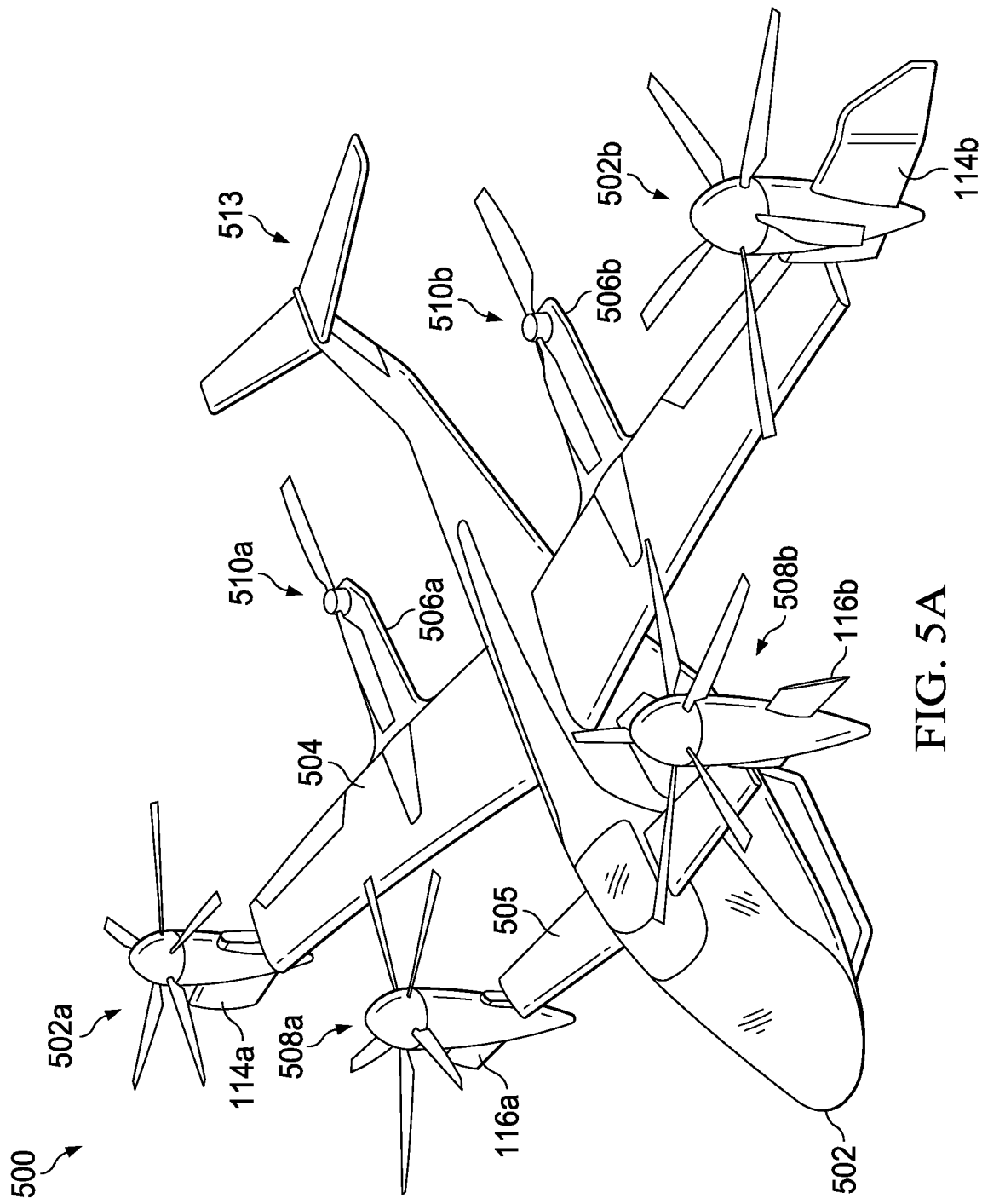
FIGS. 5A-5B illustrate another tiltrotor aircraft having a tilting hexrotor configuration in accordance with alternative embodiments described herein.

The tilting pylons in certain ones of the following illustrative example include forward tilting pylon on a boom and typically aft rotors above or below the boom. In some cases, the aft rotor are tiltable on a tail surface or below the boom. The wing tip rotor may either tilt independently of the wing (as shown in FIGS. 3A, 4A, and 5A) or tilt with a portion of the wing rotating with it (as shown in FIG. 1A). In either case, the portion of the wing outboard of the pylon may tilt with the pylon or remain stationary. When rotating with the rotating pylon, all of the wing or any percentage of the wing may rotate. No or minimal wing rotating with the pylon improves drag during transition from hover mode to cruise mode, as the flow on the wing remains largely attached as opposed to stalled, which can create large drag and lift issues. Allowing the wing to rotate minimizes download in hover mode due to impingement of the rotor stream on exposed airframe/wing surfaces, reducing net rotor lift and power required in hover. The tail may be independent of the propulsive boom or attached as a primary load path.

Figure 1B:
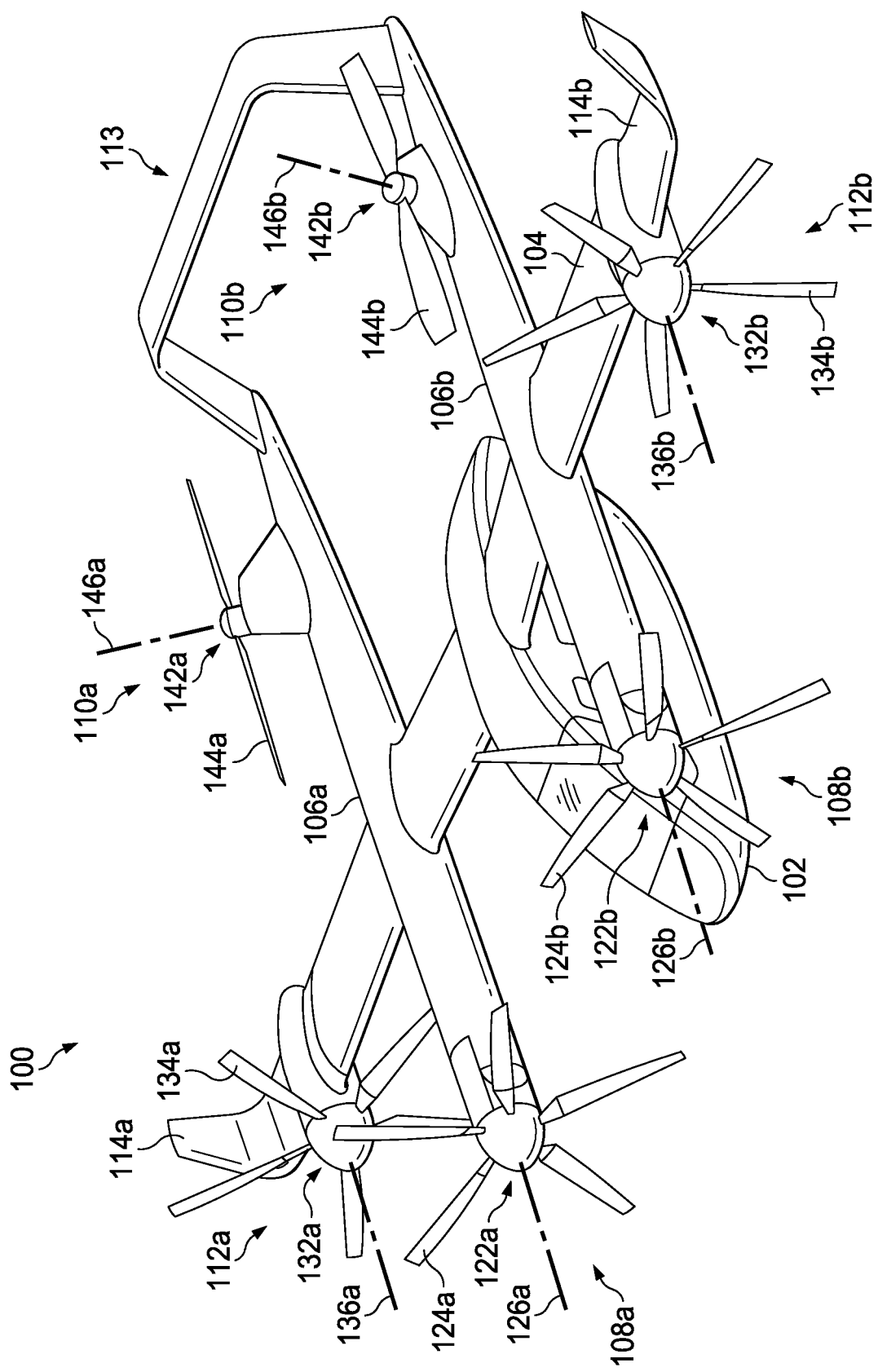

FIGS. 1A and 1B illustrate an example tiltrotor aircraft 100 that is convertible between a VTOL or hover (also commonly referred to as helicopter) mode (shown in FIG. 1A), which allows for vertical takeoff and landing, hovering, and low speed directional movement, and a cruise (also commonly referred to as airplane) mode (shown in FIG. 1B), which allows for forward flight as well as horizontal takeoff and landing. Aircraft 100 includes a fuselage 102, wing 104, and booms 106a, 106b, connected to the wing on opposite sides of the fuselage 102. In accordance with features of embodiments described herein, aircraft further includes three pairs of propulsion systems, including forward propulsion systems 108a, 108b, adjacent to the forward end of the fuselage 102, aft propulsion systems 110a, 110b, adjacent to the aft end of the fuselage 102, and a pair of wing-mounted propulsion systems 112a, 112b, proximate opposite tips of wing 104. In the illustrated embodiment, forward propulsion systems 108a, 108b, are attached to forward ends of booms 106a, 106b, respectively, and aft propulsion systems 110a, 110b, are attached to booms 106a, 106b, respectively, proximate aft ends thereof. Aircraft 100 further includes a tail assembly 113 at an aft end thereof.

In the illustrated embodiment, each forward propulsion system 108a, 108b, includes a drive system housing comprising a pylon 120a, 120b, and a rotatable open rotor assembly 122a, 122b, comprising a plurality of rotor blades 124a, 124b, connected to a rotor mast and configured to rotate about a rotor axis 126a, 126b. As shown in FIGS. 1A and 1B, each rotor assembly 122a, 122b, includes five (5) rotor blades; however, it should be recognized that more or fewer blades may be implemented without departing from the spirit and the scope of the embodiments described. Rotation of rotor blades 124a, 124b, about rotor axis 126a, 126b, generates lift while operating in helicopter mode and thrust while operating in airplane mode. Each pylon 120a, 120b, may house one or more electric motors therein configured to produce rotational energy that drives the rotation of rotor assembly 122a, 122b. Alternatively, each pylon 120a, 120b, may house a gearbox therein that drives the rotation of rotor assembly 122a, 122b, wherein the gearbox receives rotational energy from a driveshaft.

In the illustrated embodiment, each wing-mounted propulsion system 112a, 112b, includes a drive system housing comprising a pylon 130a, 130b, and a rotatable open rotor assembly 132a, 132b, comprising a plurality of rotor blades 134a, 134b, connected to a rotor mast and configured to rotate about a rotor axis 136a, 136b. As shown in FIGS. 1A and 1B, each rotor assembly 132a, 132b, includes five (5) rotor blades; however, it should be recognized that more or fewer blades may be implemented without departing from the spirit and the scope of the embodiments described. It should also be recognized that rotor assemblies 132a, 132b, may include a different number of rotor blades than rotor assemblies 122a, 122b. Rotation of rotor blades 134a, 134b, about rotor axis 136a, 136b, generates lift while operating in helicopter mode and thrust while operating in airplane mode. Each pylon 130a, 130b, may house one or more electric motors therein configured to produce rotational energy that drives the rotation of rotor assembly 132a, 132b. Alternatively, each pylon 130a, 130b, may house a gearbox therein that drives the rotation of rotor assembly 132a, 132b, wherein the gearbox receives rotational energy from a driveshaft.

In the illustrated embodiment, each aft propulsion system 110a, 110b, includes a drive system housing comprising a pylon 140a, 140b, and a rotatable open rotor assembly 142a, 142b, comprising a plurality of rotor blades 144a, 144b, connected to a rotor mast and configured to rotate about a rotor axis 146a, 146b. As shown in FIGS. 1A and 1B, each rotor assembly 142a, 142b, includes two (2) rotor blades; however, it should be recognized that more or fewer blades on a single or stacked rotor may be implemented without departing from the spirit and the scope of the embodiments described. Rotation of rotor blades 144a, 144b, about rotor axis 146a, 146b, generates lift while operating in helicopter mode. Each pylon 140a, 140b, may house one or more electric motors therein configured to produce rotational energy that drives the rotation of rotor assembly 142a, 142b. Alternatively, each pylon 140a, 140b, may house a gearbox therein that drives the rotation of rotor assembly 142a, 142b, wherein the gearbox receives rotational energy from a driveshaft. It will be recognized that while rotor assemblies 142a, 142b, are illustrated as being disposed above (i.e., on top of) booms 104a, 104b, they may alternatively be disposed below (i.e., on the underside of) booms and the distance from rotor to boom may vary or there may be rotor above and below the pylon as yet another alternative.

The fairings of pylons 140a, 140b, are designed to reduce the rotor-boom noise. In particular, there are two parameters that influence the acoustics of rotors over booms, including the relative width W of the boom surface (narrow is better than wide) and the ratio of the height of the rotor h to the rotor radius R (the higher the better). The fairings function to elevate the rotor above the boom, thereby to increase h/R and lower the acoustic impact of the rotor over the boom, and to cover the mast to prevent the elevated rotor from being overly penalizing in drag, as the fairing has lower drag than an exposed mast. The fairing is also much narrower (lower relative W) than original boom as well, which provides additional acoustic advantages.

In accordance with features of embodiments described herein, and as illustrated in FIGS. 1A and 1B, wing-mounted propulsion systems 112a, 112b, are connected to inboard ends of wing tips 114a, 114b, attached to outboard ends of wing 104. Wing tips 114a, 114b, together with wing-mounted propulsion systems 112a, 112b, tilt relative to wing 104 between a first position (FIG. 1A), in which propulsion systems 112a, 112b, and wing tips 114a, 114b, are configured in a hover mode, and a second position (FIG. 1B), in which propulsion systems 112a, 112b, and wing tips 114a, 114b, are configured in a cruise mode. Similarly, forward propulsion systems 108a, 108b, (and more specifically, pylons 120a, 120b) are tiltably connected to forward ends of booms 106a, 106b, such that they may be tilted between a first position (FIG. 1A), in which propulsion systems 108a, 108b, are configured in a hover mode, and a second position (FIG. 1B), in which propulsion systems 108a, 108b, are configured in a cruise mode. In accordance with features of embodiments described herein, aft propulsion systems 110a, 110b, are fixedly attached to booms 106a, 106b, proximate aft ends thereof and do not convert between hover mode (FIG. 1A) and cruise mode (FIG. 1B).

The position of rotor assemblies 122a, 122b, 132a, 132b, as well as the pitch of individual rotor blades 124a, 124b, 134a, 134b, 144a, 144b, can be selectively controlled in order to selectively control direction, thrust, and lift of aircraft 100. As previously noted, propulsion systems 108a, 108b, 112a, 112b, are each convertible, relative to fuselage 102, between a vertical position, as shown in FIG. 1A, and a horizontal position, as shown in FIG. 1B. Propulsion systems 108a, 108b, 112a, 112b, are in the vertical position during vertical takeoff and landing mode. Vertical takeoff and landing mode may be considered to include hover operations of aircraft 100. Propulsion systems 108a, 108b, 112a, 112b, are in the horizontal position during forward flight mode, in which aircraft 100 is in forward flight. In forward flight mode, propulsion systems 108a, 108b, 112a, 112b, direct their respective thrusts in the aft direction to propel aircraft 100 forward. Aircraft 100 is operable to fly in all directions during the vertical takeoff and landing mode configuration of FIG. 1A, although faster forward flight is achievable while in the forward flight mode configuration of FIG. 1B. Propulsion systems 108a, 108b, 112a, 112b, may be tiltable between the vertical and horizontal positions by actuators (not shown) that are tiltable in response to commands originating from a pilot and/or a flight control system. Each of the propulsion systems 108a, 108b, 110a, 110b, 112a, 112b, may utilize an electric motor and gearbox unit disposed within a respective pylon 120a, 120b, 130a, 130b, 140a, 140b or a direct drive motor of group of motors on the same shaft as a power source to rotate the respective rotor assembly 122a, 122b, 132a, 132b, 142a, 142b, about rotor axis 126a, 126b, 136a, 136b, 146a, 146b, via a rotor mast.

It should be noted that, although propulsion systems 108a, 108b, are shown and described as being tiltable between cruise and hover positions, those propulsion systems may be fixed in the hover positions, similarly to propulsion systems 110a, 110b. Additionally and/or alternatively, propulsion systems 112a, 112b, may be connected to opposite ends of wing 104 such that only pylons 130a, 130b, or a portion thereof, are tiltable relative to wing 104. The tiltable pylons 130a, 130b and 108a and 108b may also be differentially tiltable and may vary in power to control yaw of the aircraft whereas different thrust for roll and pitch is controlled through differential blade pitch, rpm, and motor power.

In accordance with features of embodiments described herein, when aircraft 100 is in cruise mode, rotor assemblies 142a, 142b, may cease rotation. In embodiments in which propulsion systems 108a, 108b, are also fixed (i.e., do not convert between hover and cruise modes), rotor assemblies 122a, 122b, may also cease rotation when aircraft 100 is in cruise mode. Fewer active rotor assemblies in cruise mode improves blade loading and propulsive efficiency of the props. In addition, stopping the aft rotors avoids ingestion of the wakes from the forward rotors, which would make the aft rotors less efficient. With six rotor assemblies, a rotor assembly can be lost while still allowing aircraft 100 to hover even without motor redundancy per rotor assembly. In the event of a rotor failure, the rotor on the opposite side of the aircraft would be powered down, allowing the aircraft to hover as a quad copter with the four remaining rotors operating at elevated power levels. In accordance with features of embodiments described herein, if the aft left rotor were to fail, the forward right rotor would also be powered down, allowing the thrust on the remaining rotors to balance. Electric power to the motors allows the distributed nature of the aircraft 100 to stay weight efficient without requiring extensive cross-connects.

Figure 2:
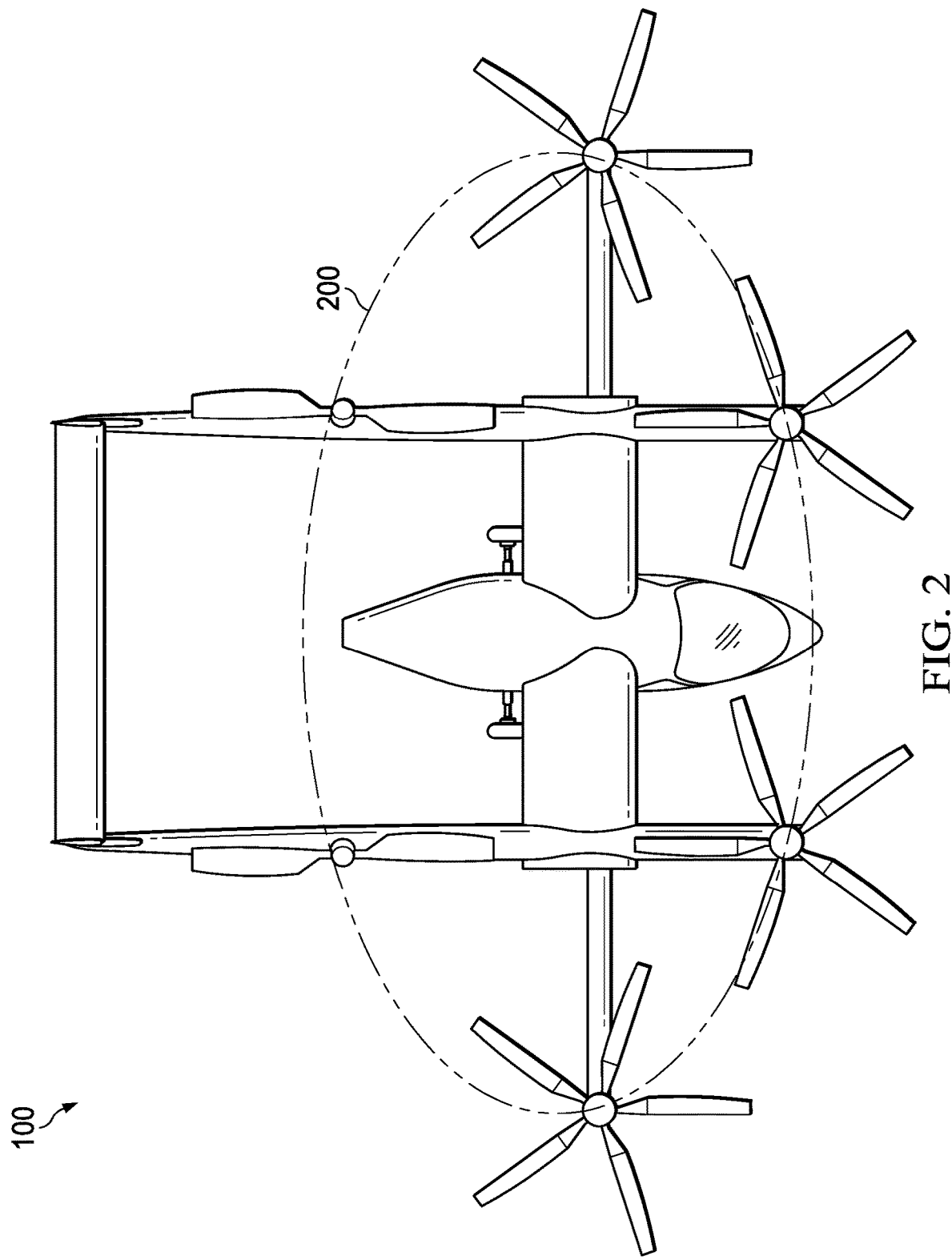
FIG. 2 illustrates a hexrotor arc arrangement of rotors of the tiltrotor aircraft of FIGS. 1A and 1B.

Because the aircraft 100 includes six (6) rotor assemblies, the aircraft may be referred to as a "hexrotor aircraft." FIG. 2 illustrates a hexrotor arc arrangement 200 when aircraft 100 is in hover mode. In particular, to allow the minimum number of rotors and still allow loss of a rotor as a recoverable failure mechanism in a hover, the rotors are arranged in an arc arrangement both side-to-side and forward-to-aft. As a result, when one rotor is lost and a second rotor is powered down, the aircraft can still be balanced as a quad arrangement on the remaining rotors. If a linear arrangement were used, the power and balance requirements would prevent recovery on just four rotors. Multi-copters with more than six rotors may recover by offsetting opposing rotors, but six in the illustrated arc arrangement is the minimum to allow a recovery after failure and result in significant weight savings due to fewer redundant motors and rotors.

Figure 3B:
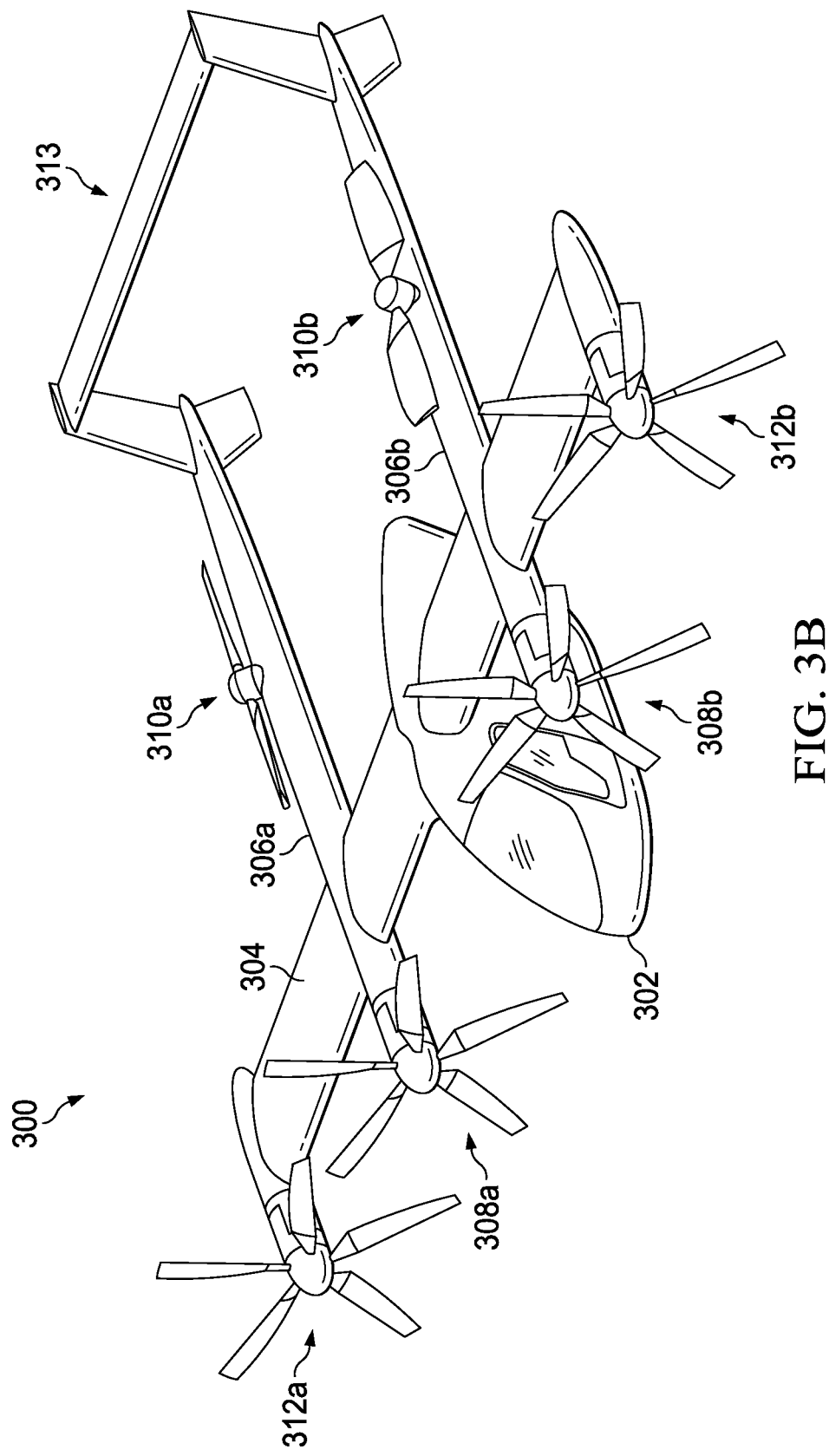

FIGS. 3A and 3B illustrate an example tiltrotor aircraft 300 that is convertible between a VTOL or hover (also commonly referred to as helicopter) mode (shown in FIG. 3A), which allows for vertical takeoff and landing, hovering, and low speed directional movement, and a cruise (also commonly referred to as airplane) mode (shown in FIG. 3B), which allows for forward flight as well as horizontal takeoff and landing. Aircraft 300 includes a fuselage 302, wing 304, and booms 306a, 306b, connected to the wing on opposite sides of the fuselage 302. In accordance with features of embodiments described herein, aircraft further includes three pairs of propulsion systems, including a first pair of boom-mounted propulsion systems 308a, 308b, a second pair of boom-mounted propulsion systems 310a, 310b, and a pair of wing-mounted propulsion systems 312a, 312b. In the illustrated embodiment, propulsion systems 312a, 312b, are tiltably connected to the forward edge of wing 304 at outboard ends thereof, while propulsion systems 308a, 308b, are tiltably connected to the forward end of booms 306a, 306b inboard of propulsion systems 312a, 312b. Alternatively, propulsion systems 308a, 308b, may be tiltably connected to the forward edge of wing 304 inboard of propulsion systems 312a, 312b. Propulsion systems 310a, 310b, are mounted to upper surfaces of booms 304a, 304b, proximate the aft end or aft of the fuselage 302. Aircraft 300 further includes a tail assembly 313 at an aft end thereof.

Similar to the propulsion systems of aircraft 100, each of propulsion systems 308a, 308b, 310a, 310b, 312a, and 312b may include a drive system housing comprising a pylon, and a rotatable open rotor assembly comprising a plurality of rotor blades connected to a rotor mast and configured to rotate about a rotor axis. As shown in FIGS. 3A and 3B, the rotor assembly of each of propulsion systems 308a, 308b, 312a, 312b, includes five (5) rotor blades; however, it should be recognized that more or fewer blades may be implemented without departing from the spirit and the scope of the embodiments described. It should also be recognized that rotor assemblies of propulsion systems 308a, 308b, may include a different number of rotor blades than rotor assemblies of propulsion systems 312a, 312b. Rotation of rotor assemblies of propulsion systems 308a, 308b, 312a, and 312b generates lift while the aircraft 300 is operating in helicopter mode and thrust while the aircraft 300 is operating in airplane mode.

In the illustrated embodiment, each boom-mounted propulsion system 310a, 310b, includes a drive system housing comprising a pylon and a rotatable open rotor assembly comprising a plurality of rotor blades connected to a rotor mast and configured to rotate about a rotor axis. As shown in FIGS. 3A and 3B, each rotor assembly of propulsion systems 310a, 310b, includes two (2) rotor blades; however, it should be recognized that more or fewer blades may be implemented without departing from the spirit and the scope of the embodiments described. Rotation of rotor assemblies of propulsion systems 310a, 310b, generates lift while the aircraft 300 is operating in helicopter mode. It will be recognized that while rotor assemblies of propulsion systems 310a, 310b, are illustrated as being disposed above (i.e., on top of) booms 304a, 304b, they may alternatively be disposed below (i.e., on the underside of) booms.

In accordance with features of embodiments described herein, and as illustrated in FIGS. 3A and 3B, propulsion systems 308a, 308b, 312a, 312b, are tiltably connected to the wing 304 and tilt relative to wing between a first position (FIG. 3A), in which propulsion systems 308a, 308b, 312a, 312b, are configured in a hover mode, and a second position (FIG. 3B), in which propulsion systems 308a, 308b, 312a, 312b, are configured in a cruise mode. In accordance with features of embodiments described herein, aft propulsion systems 310a, 310b, are fixedly attached to booms 306a, 306b, aft of the wing 304 in hover mode and do not convert between hover mode (FIG. 3A) and cruise mode (FIG. 3B).

The position of rotor assemblies of propulsion systems 308a, 308b, 312a, 312b, as well as the pitch of individual rotor blades of all of the propulsion systems 308a, 308b, 310a, 310b, 312a, 312b, can be selectively controlled in order to selectively control direction, thrust, and lift of aircraft 300. As previously noted, propulsion systems 308a, 308b, 312a, 312b, are each convertible, relative to fuselage 302, between a vertical position, as shown in FIG. 3A, and a horizontal position, as shown in FIG. 3B. Propulsion systems 308a, 308b, 312a, 312b, are in the vertical position during vertical takeoff and landing mode. Vertical takeoff and landing mode may be considered to include hover operations of aircraft 300. Propulsion systems 308a, 308b, 312a, 312b, are in the horizontal position during forward flight mode, in which aircraft 300 is in forward flight. In forward flight mode, propulsion systems 308a, 308b, 312a, 312b, direct their respective thrusts in the aft direction to propel aircraft 300 forward. Aircraft 300 is operable to fly in all directions during the vertical takeoff and landing mode configuration of FIG. 3A, although faster forward flight is achievable while in the forward flight mode configuration of FIG. 3B. Propulsion systems 308a, 308b, 312a, 312b, may be tiltable between the vertical and horizontal positions by actuators (not shown) that are tiltable in response to commands originating from a pilot and/or a flight control system.

It should be noted that, although propulsion systems 308a, 308b, are shown and described as being tiltable between cruise and hover positions, those propulsion systems may be fixed in the hover positions, similarly to propulsion systems 310a, 310b.

In accordance with features of embodiments described herein, in certain embodiments, when aircraft 300 is in cruise mode, rotor assemblies of propulsion systems 310a, 310b, may cease rotation. In embodiments in which propulsion systems 308a, 308b, are also fixed (i.e., do not convert between hover and cruise modes), rotor assemblies thereof may also cease rotation when aircraft 300 is in cruise mode. For rotors fixed in a hover or horizontal position, stopping the rotor when in transition to cruise flight on the wing reduces power requirements not contributing to forward flight. Drag is reduced by stopping the rotor such that only the tip presents frontal area. Propulsive efficiency of the remaining rotors is increased as the remaining rotors blade loading increases in cruise in comparison to power lost as a function of rotating the blade.

Figure 4B:
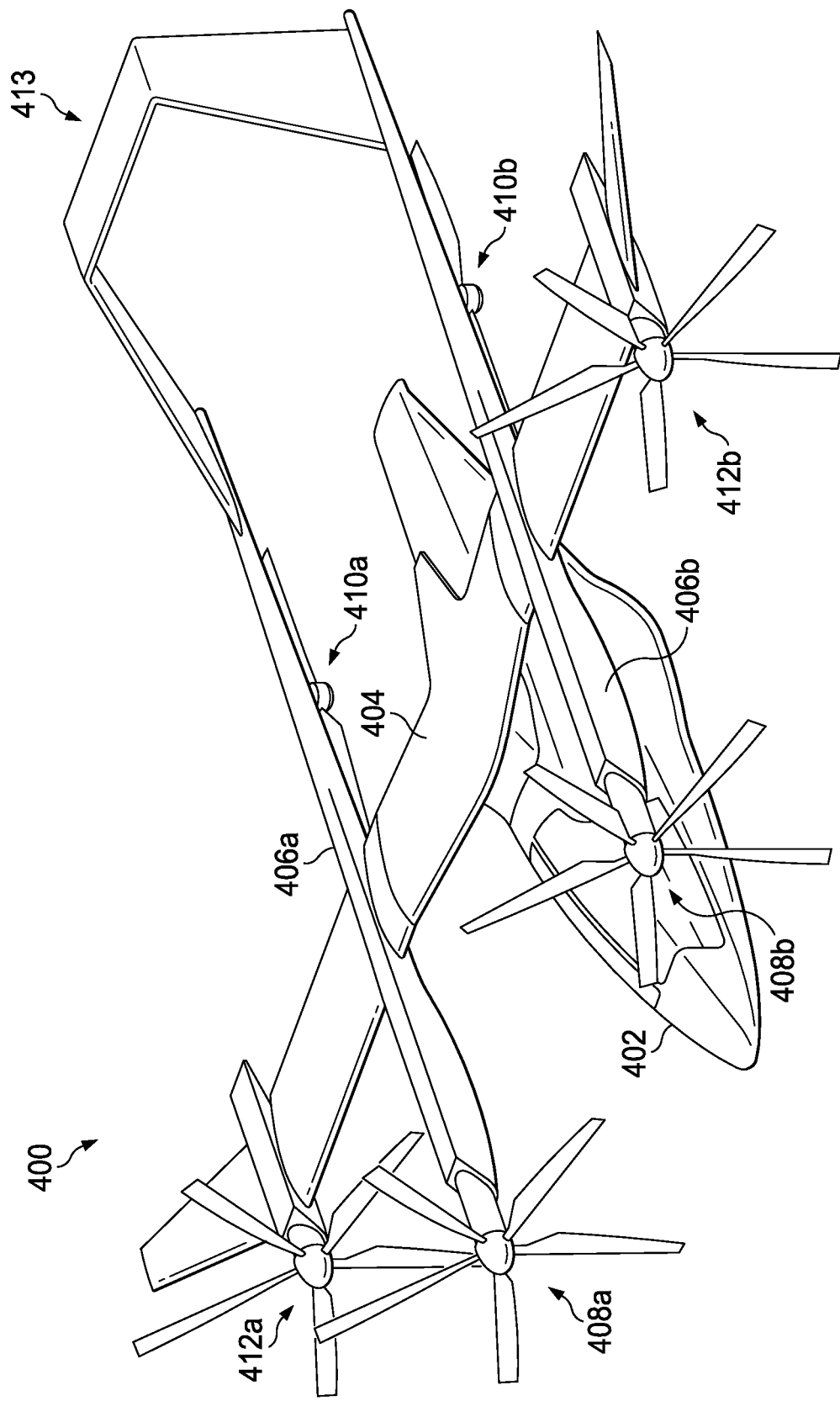

FIGS. 4A and 4B illustrate an example tiltrotor aircraft 400 that is convertible between a VTOL or hover (also commonly referred to as helicopter) mode (shown in FIG. 4A), which allows for vertical takeoff and landing, hovering, and low speed directional movement, and a cruise (also commonly referred to as airplane) mode (shown in FIG. 4B), which allows for forward flight as well as horizontal takeoff and landing. Aircraft 400 includes a fuselage 402, wing 404, and booms 406a, 406b, connected to the wing on opposite sides of the fuselage 402. In accordance with features of embodiments described herein, aircraft further includes three pairs of propulsion systems, including a forward pair of boom-mounted propulsion systems 408a, 408b, an aft pair of boom-mounted propulsion systems 410a, 410b, and a pair of wing-mounted propulsion systems 412a, 412b. In the illustrated embodiment, propulsion systems 412a, 412b, are tiltably connected to the wing 404 proximate outboard ends thereof, while propulsion systems 408a, 408b, are tiltably connected to the forward end of wing booms 404a, 404b. Propulsion systems 410a, 410b, are mounted to bottom surfaces of booms 404a, 404b, proximate the aft end of the fuselage 402. Aircraft 400 further includes a tail assembly 413 at an aft end thereof.

Similar to the propulsion systems of aircraft 100, each of propulsion systems 408a, 408b, 410a, 410b, 412a, and 412b may include a drive system housing comprising a pylon, and a rotatable open rotor assembly comprising a plurality of rotor blades connected to a rotor mast and configured to rotate about a rotor axis. As shown in FIGS. 4A and 4B, the rotor assembly of each of propulsion systems 408a, 408b, 412a, 412b, includes five (5) rotor blades; however, it should be recognized that more or fewer blades may be implemented without departing from the spirit and the scope of the embodiments described. It should also be recognized that rotor assemblies of propulsion systems 408a, 408b, may include a different number of rotor blades than rotor assemblies of propulsion systems 412a, 412b. Rotation of rotor assemblies of propulsion systems 408a, 408b, 412a, and 412b generates lift while the aircraft 400 is operating in helicopter mode and thrust while the aircraft 400 is operating in airplane mode.

In the illustrated embodiment, each boom-mounted propulsion system 410a, 410b, includes a drive system housing comprising a pylon and a rotatable open rotor assembly comprising a plurality of rotor blades connected to a rotor mast and configured to rotate about a rotor axis. As shown in FIGS. 4A and 4B, each rotor assembly of propulsion systems 410a, 410b, includes two (2) rotor blades; however, it should be recognized that more or fewer blades may be implemented without departing from the spirit and the scope of the embodiments described. Rotation of rotor assemblies of propulsion systems 410a, 410b, generates lift while the aircraft 400 is operating in helicopter mode. It will be recognized that while rotor assemblies of propulsion systems 410a, 410b, are illustrated as being disposed below (i.e., on the underside of) booms 404a, 404b, they may alternatively be disposed above (i.e., on top of) booms.

In accordance with features of embodiments described herein, and as illustrated in FIGS. 4A and 4B, propulsion systems 412a, 412b, are connected to inboard ends of wing tips 414a, 414b, disposed on outboard ends of wing 404. Wing tips 414a, 414b, together with wing-mounted propulsion systems 412a, 412b, tilt relative to wing 404 between a first position (FIG. 4A), in which propulsion systems 412a, 412b, and wing tips 414a, 414b, are configured in a hover mode, and a second position (FIG. 4B), in which propulsion systems 412a, 412b, and wing tips 414a, 414b, are configured in a cruise mode.

Similarly, forward propulsion systems 408a, 408B, are tiltably connected to forward ends of booms and tiltable between a first position (FIG. 4A), in which propulsion systems 408a, 408b, 412a, 412b, are configured in a hover mode, and a second position (FIG. 4B), in which propulsion systems 408a, 408b, 412a, 412b, are configured in a cruise mode. In accordance with features of embodiments described herein, aft propulsion systems 410a, 410b, are fixedly attached to booms 406a, 406b, aft of the wing 404 in hover mode and do not convert between hover mode (FIG. 4A) and cruise mode (FIG. 4B).

The position of rotor assemblies of propulsion systems 408a, 408b, 412a, 412b, as well as the pitch of individual rotor blades of all of the propulsion systems 408a, 408b, 410a, 410b, 412a, 412b, can be selectively controlled in order to selectively control direction, thrust, and lift of aircraft 400. As previously noted, propulsion systems 408a, 408b, 412a, 412b, are each convertible, relative to fuselage 402, between a vertical position, as shown in FIG. 4A, and a horizontal position, as shown in FIG. 4B. Propulsion systems 408a, 408b, 412a, 412b, are in the vertical position during vertical takeoff and landing mode. Vertical takeoff and landing mode may be considered to include hover operations of aircraft 400. Propulsion systems 408a, 408b, 412a, 412b, are in the horizontal position during forward flight mode, in which aircraft 400 is in forward flight. In forward flight mode, propulsion systems 408a, 408b, 412a, 412b, direct their respective thrusts in the aft direction to propel aircraft 400 forward. Aircraft 400 is operable to fly in all directions during the vertical takeoff and landing mode configuration of FIG. 4A, although faster forward flight is achievable while in the forward flight mode configuration of FIG. 4B. Propulsion systems 408a, 408b, 412a, 412b, may be tiltable between the vertical and horizontal positions by actuators (not shown) that are tiltable in response to commands originating from a pilot and/or a flight control system.

It should be noted that, although propulsion systems 408a, 408b, are shown and described as being tiltable between cruise and hover positions, those propulsion systems may be fixed in the hover positions, similarly to propulsion systems 410a, 410b.

In accordance with features of embodiments described herein, in certain embodiments, when aircraft 400 is in cruise mode, rotor assemblies of propulsion systems 410a, 410b, may cease rotation. In embodiments in which propulsion systems 408a, 408b, are also fixed (i.e., do not convert between hover and cruise modes), rotor assemblies thereof may also cease rotation when aircraft 400 is in cruise mode.

Aircraft 400 functions similarly to aircraft 300, with the primary benefit being a wing extension outboard of the rotor pylon that allows greater efficiency in cruise than a wing with less span. The wing extension rotor with rotor pylon to minimize download in hover due the impingement of the rotor downwash on its exposed surfaces.

Figure 5B:
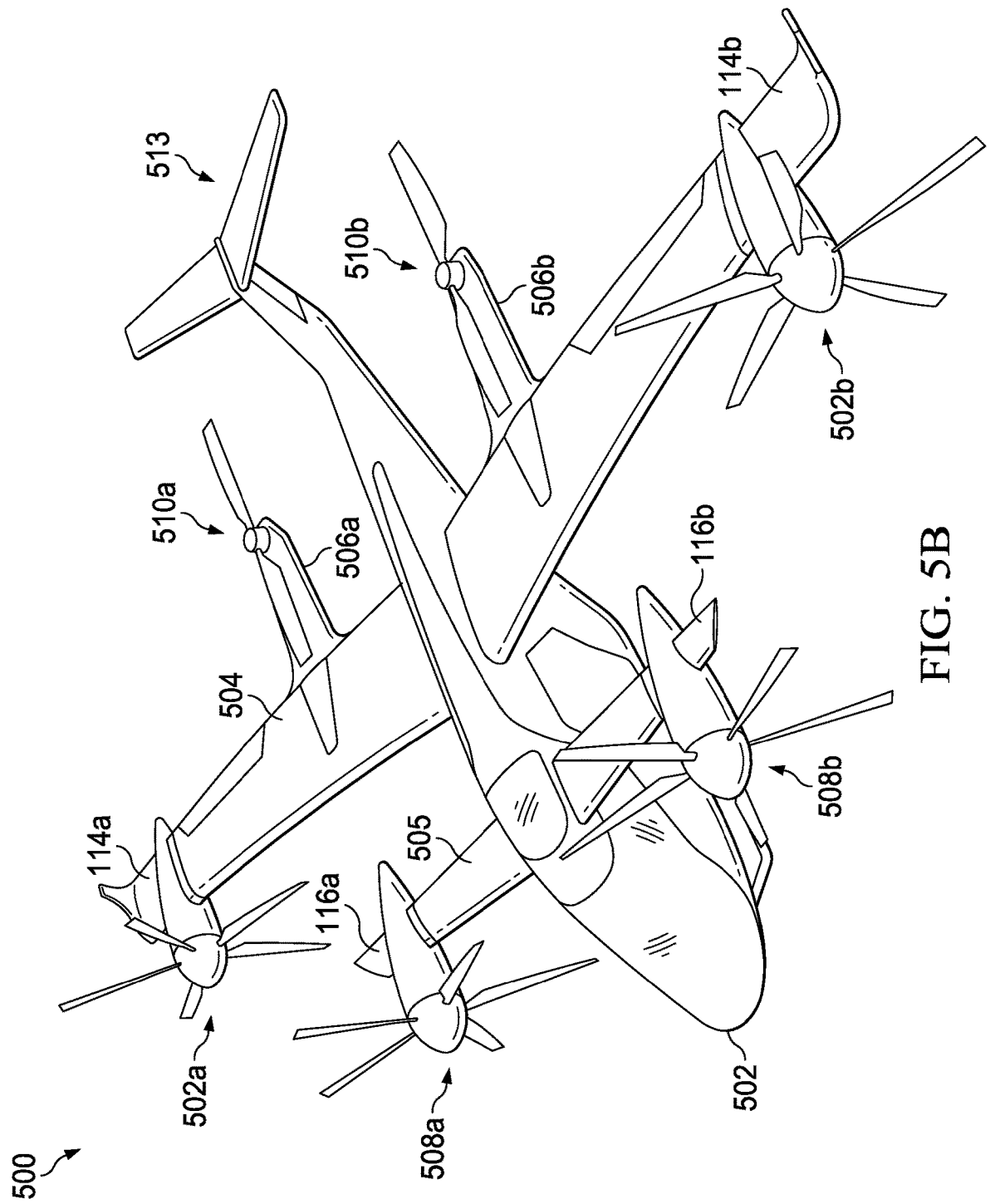

FIGS. 5A and 5B illustrate an example tiltrotor aircraft 500 that is convertible between a VTOL or hover (also commonly referred to as helicopter) mode (shown in FIG. 5A), which allows for vertical takeoff and landing, hovering, and low speed directional movement, and a cruise (also commonly referred to as airplane) mode (shown in FIG. 5B), which allows for forward flight as well as horizontal takeoff and landing. Aircraft 500 includes a fuselage 502, aft wing 504, forward wing 505, and booms 506a, 506b, connected to the wing 504 on opposite sides of the fuselage 502. In accordance with features of embodiments described herein, aircraft further includes three pairs of propulsion systems, including a first pair of wing-mounted propulsion systems 508a, 508b, a pair of boom-mounted propulsion systems 510a, 510b, and a second pair of wing-mounted propulsion systems 512a, 512b. In the illustrated embodiment, propulsion systems 512a, 512b, are tiltably connected to wing 504 proximate outboard ends thereof, while propulsion systems 508a, 508b, are tiltably connected to wing 505 proximate outboard ends thereof and are disposed inboard of propulsion systems 512a, 512b. Propulsion systems 510a, 510b, are mounted to upper surfaces of booms 505A, 505B, proximate aft ends thereof. Aircraft 500 further includes a tail assembly 513 at an aft end thereof.

Similar to the propulsion systems of aircraft 100, each of propulsion systems 508a, 508b, 510a, 510b, 512a, and 512b may include a drive system housing comprising a pylon, and a rotatable open rotor assembly comprising a plurality of rotor blades connected to a rotor mast and configured to rotate about a rotor axis. As shown in FIGS. 5A and 5B, the rotor assembly of each of propulsion systems 508a, 508b, 512a, 512b, includes five (5) rotor blades; however, it should be recognized that more or fewer blades may be implemented without departing from the spirit and the scope of the embodiments described. It should also be recognized that rotor assemblies of propulsion systems 508a, 508b, may include a different number of rotor blades than rotor assemblies of propulsion systems 512a, 512b. Rotation of rotor assemblies of propulsion systems 508a, 508b, 512a, and 512b generates lift while the aircraft 500 is operating in helicopter mode and thrust while the aircraft 500 is operating in airplane mode.

In the illustrated embodiment, each boom-mounted propulsion system 510a, 510b, includes a drive system housing comprising a pylon and a rotatable open rotor assembly comprising a plurality of rotor blades connected to a rotor mast and configured to rotate about a rotor axis. As shown in FIGS. 5A and 5B, each rotor assembly of propulsion systems 510a, 510b, includes two (2) rotor blades; however, it should be recognized that more or fewer blades may be implemented without departing from the spirit and the scope of the embodiments described. Rotation of rotor assemblies of propulsion systems 510a, 510b, generates lift while the aircraft 500 is operating in helicopter mode. It will be recognized that while rotor assemblies of propulsion systems 510a, 510b, are illustrated as being disposed above (i.e., on top of) booms 505A, 505B, they may alternatively be disposed below (i.e., on the underside of) booms.

In accordance with features of embodiments described herein, and as illustrated in FIGS. 5A and 5B, propulsion systems 512a, 512b, are connected to inboard ends of wing tips 514a, 514b, disposed on outboard ends of wing 504. Wing tips 514a, 514b, together with wing-mounted propulsion systems 512a, 512b, tilt relative to wing 504 between a first position (FIG. 5A), in which propulsion systems 512a, 512b, and wing tips 514a, 514b, are configured in a hover mode, and a second position (FIG. 5B), in which propulsion systems 512a, 512b, and wing tips 514a, 514b, are configured in a cruise mode.

Similarly, in accordance with features of embodiments described herein, and as illustrated in FIGS. 5A and 5B, propulsion systems 508a, 508b, are connected to inboard ends of wing tips 515a, 515b, disposed on outboard ends of wing 505. Wing tips 515a, 515b, together with wing-mounted propulsion systems 508a, 508b, tilt relative to wing 505 between a first position (FIG. 5A), in which propulsion systems 508a, 508b, and wing tips 515a, 515b, are configured in a hover mode, and a second position (FIG. 5B), in which propulsion systems 508a, 508b, and wing tips 515a, 515b, are configured in a cruise mode.

In accordance with features of embodiments described herein, aft propulsion systems 510a, 510b, are fixedly attached to booms 506a, 506b, aft of the wing 504 in hover mode and do not convert between hover mode (FIG. 5A) and cruise mode (FIG. 5B).

The position of rotor assemblies of propulsion systems 508a, 508b, 512a, 512b, as well as the pitch of individual rotor blades of all of the propulsion systems 508a, 508b, 510a, 510b, 512a, 512b, can be selectively controlled in order to selectively control direction, thrust, and lift of aircraft 500. As previously noted, propulsion systems 508a, 508b, 512a, 512b, are each convertible, relative to fuselage 502, between a vertical position, as shown in FIG. 5A, and a horizontal position, as shown in FIG. 5B. Propulsion systems 508a, 508b, 512a, 512b, are in the vertical position during vertical takeoff and landing mode. Vertical takeoff and landing mode may be considered to include hover operations of aircraft 500. Propulsion systems 508a, 508b, 512a, 512b, are in the horizontal position during forward flight mode, in which aircraft 500 is in forward flight. In forward flight mode, propulsion systems 508a, 508b, 512a, 512b, direct their respective thrusts in the aft direction to propel aircraft 500 forward. Aircraft 500 is operable to fly in all directions during the vertical takeoff and landing mode configuration of FIG. 5A, although faster forward flight is achievable while in the forward flight mode configuration of FIG. 5B. Propulsion systems 508a, 508b, 512a, 512b, may be tiltable between the vertical and horizontal positions by actuators (not shown) that are tiltable in response to commands originating from a pilot and/or a flight control system.

It should be noted that, although propulsion systems 508a, 508b, are shown and described as being tiltable between cruise and hover positions, those propulsion systems may be fixed in the hover positions, similarly to propulsion systems 510a, 510b.

In accordance with features of embodiments described herein, in certain embodiments, when aircraft 500 is in cruise mode, rotor assemblies of propulsion systems 510a, 510b, may cease rotation. In embodiments in which propulsion systems 508a, 508b, are also fixed (i.e., do not convert between hover and cruise modes), rotor assemblies thereof may also cease rotation when aircraft 500 is in cruise mode. The significant features of the aircraft 500 is that a boom arrangement is avoided while the hexrotor arc arrangement in hover is maintained. The propulsion assemblies 508a, 508b, are supported by canard-like forward lifting surfaces. The propulsion assemblies 510a, 510b, are supported by extensions off the trailing edge of the wing. The tail arrangement is free to be any usual configuration such as t-tail, cruciform, v-tail or other. The propulsion assemblies 510a, 510b, could be converted into a pusher arrangement, in which case all six rotors would continue to function in cruise mode.

Figure 6A:
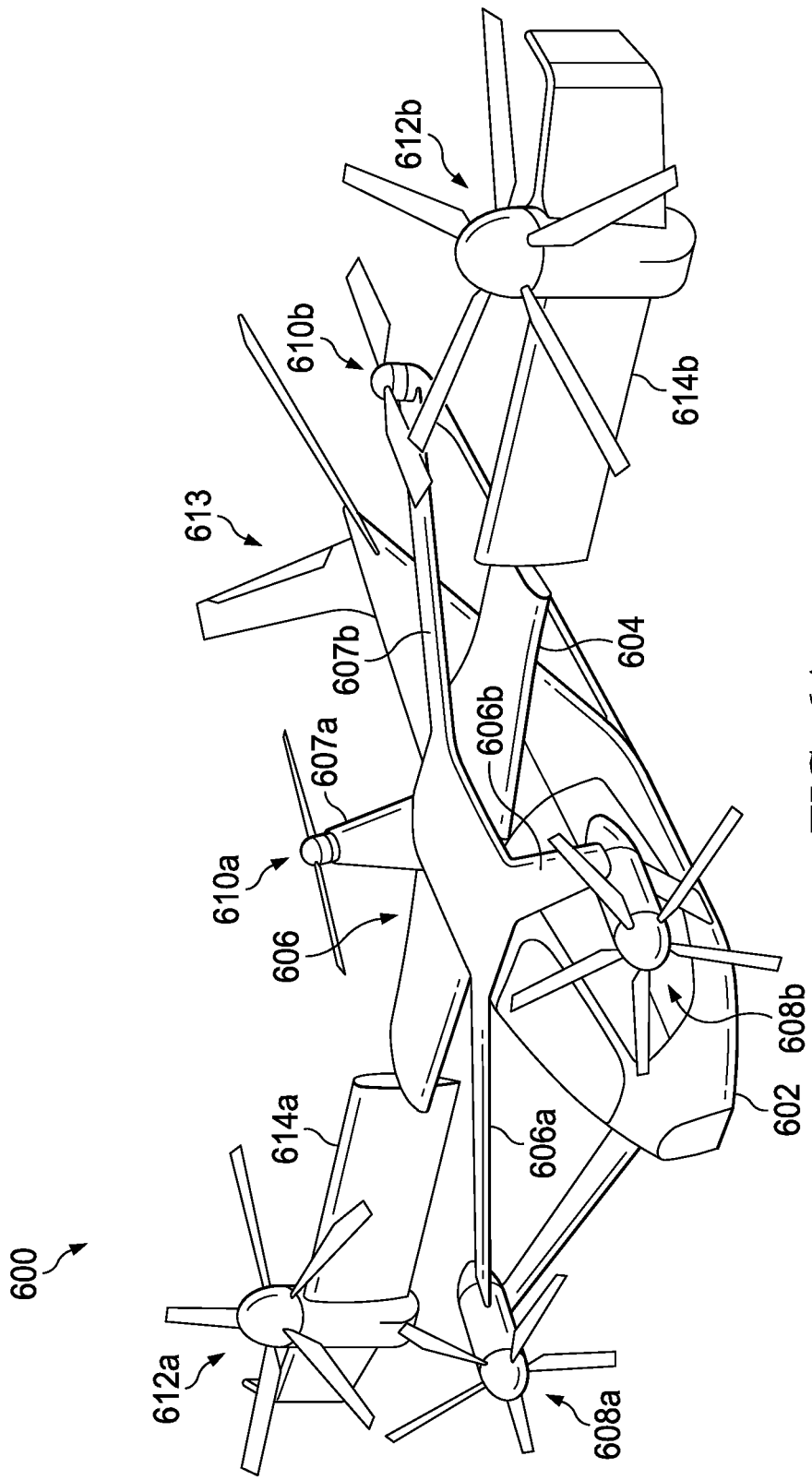
FIGS. 6A-6B illustrate another tiltrotor aircraft having a tilting hexrotor configuration in accordance with alternative embodiments described herein.
Figure 6B:
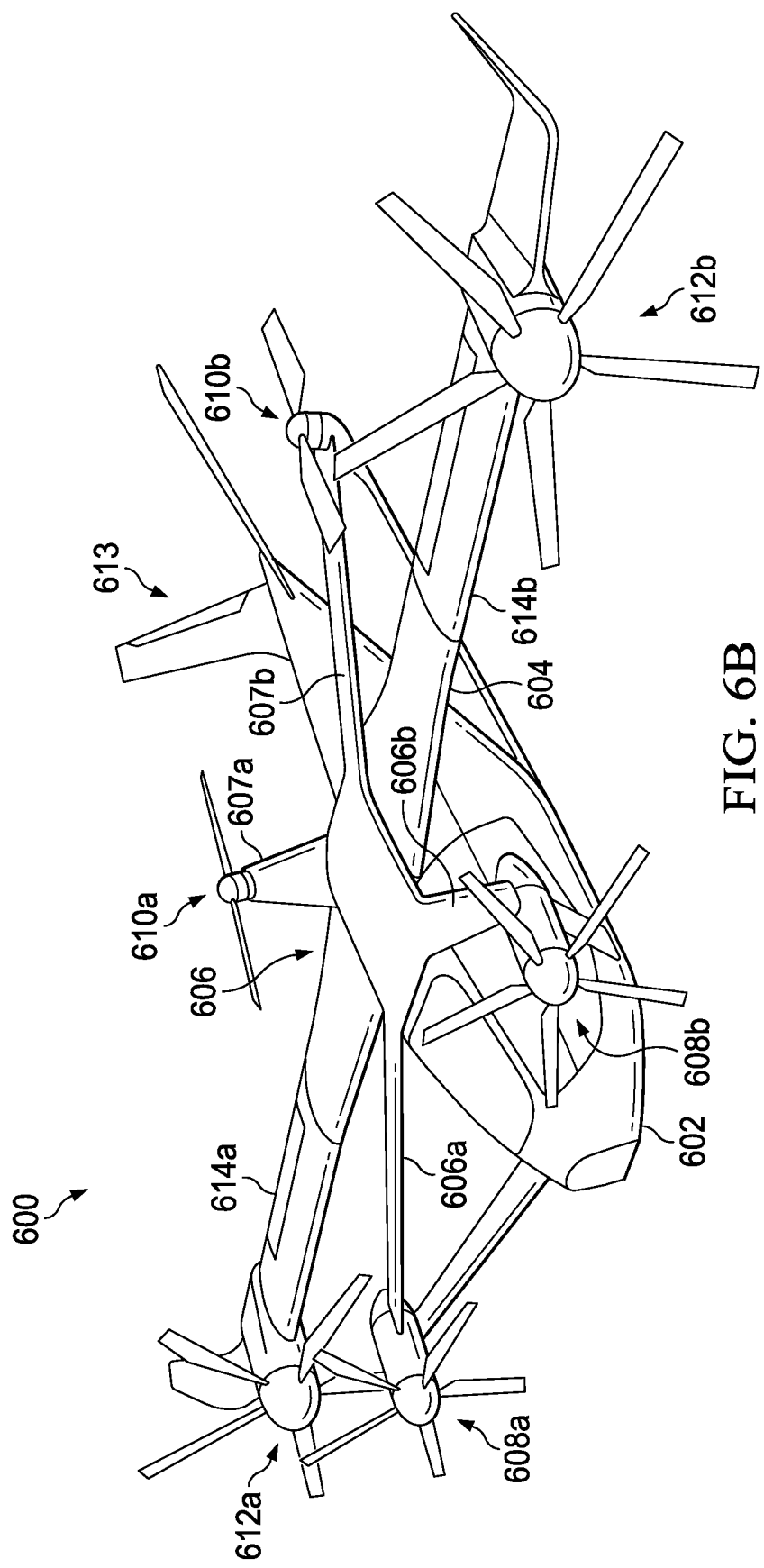

FIGS. 6A and 6B illustrate an example tiltrotor aircraft 600 that is convertible between a VTOL or hover (also commonly referred to as helicopter) mode (shown in FIG. 6A), which allows for vertical takeoff and landing, hovering, and low speed directional movement, and a cruise (also commonly referred to as airplane) mode (shown in FIG. 6B), which allows for forward flight as well as horizontal takeoff and landing. Aircraft 600 includes a fuselage 602, wing 604, and an X-shaped boom assembly 606 connected to the wing 604 and comprising boom segments 606a, 606b, 607a, 607b, that extend outboard of the fuselage 602. In accordance with features of embodiments described herein, aircraft further includes three pairs of propulsion systems, including a first pair of boom-mounted propulsion systems 608a, 608b, a second pair of boom-mounted propulsion systems 610a, 610b, and a pair of wing-mounted propulsion systems 612a, 612b. Aircraft 600 further includes a tail assembly 613 at an aft end thereof.

In the illustrated embodiment, propulsion systems 612a, 612b, are tiltably connected to wing 604 proximate outboard ends thereof, while propulsion systems 608a, 608b, are tiltably connected to outboard ends of booms 606a, 606b, inboard of propulsion systems 612a, 612b. Propulsion systems 610a, 610b, are mounted to upper surfaces of outboard ends of booms 607a, 607b, aft of the wing 604.

Similar to the propulsion systems of aircraft 100, each of propulsion systems 608a, 608b, 610a, 610b, 612a, and 612b may include a drive system housing comprising a pylon, and a rotatable open rotor assembly comprising a plurality of rotor blades connected to a rotor mast and configured to rotate about a rotor axis. As shown in FIGS. 6A and 6B, the rotor assembly of each of propulsion systems 608a, 608b, 612a, 612b, includes five (5) rotor blades; however, it should be recognized that more or fewer blades may be implemented without departing from the spirit and the scope of the embodiments described. It should also be recognized that rotor assemblies of propulsion systems 608a, 608b, may include a different number of rotor blades than rotor assemblies of propulsion systems 612a, 612b. Rotation of rotor assemblies of propulsion systems 608a, 608b, 612a, and 612b generates lift while the aircraft 600 is operating in helicopter mode and thrust while the aircraft 600 is operating in airplane mode.

In the illustrated embodiment, each boom-mounted propulsion system 610a, 610b, includes a drive system housing comprising a pylon and a rotatable open rotor assembly comprising a plurality of rotor blades connected to a rotor mast and configured to rotate about a rotor axis. As shown in FIGS. 6A and 6B, each rotor assembly of propulsion systems 610a, 610b, includes two (2) rotor blades; however, it should be recognized that more or fewer blades may be implemented without departing from the spirit and the scope of the embodiments described. Rotation of rotor assemblies of propulsion systems 610a, 610b, generates lift while the aircraft 600 is operating in helicopter mode. It will be recognized that while rotor assemblies of propulsion systems 610a, 610b, are illustrated as being disposed above (i.e., on top of) booms 607a, 607b, they may alternatively be disposed below (i.e., on the underside of) booms.

In accordance with features of embodiments described herein, and as illustrated in FIGS. 6A and 6B, propulsion systems 612a, 612b, are connected to inboard ends of wing tips 614a, 614b, disposed on outboard ends of wing 604. Wing tips 614a, 614b, together with wing-mounted propulsion systems 612a, 612b, tilt relative to wing between a first position (FIG. 6A), in which propulsion systems 612a, 612b, and wing tips 614a, 614b, are configured in a hover mode, and a second position (FIG. 6B), in which propulsion systems 612a, 612b, and wing tips 614a, 614b, are configured in a cruise mode.

Similarly, forward propulsion systems 608a, 608b, are tiltably connected to forward ends of booms 606a, 606b, and tiltable between a first position (FIG. 6A), in which propulsion systems 608a, 608b, are configured in a hover mode, and a second position (FIG. 6B), in which propulsion systems 608a, 608b, are configured in a cruise mode. In accordance with features of embodiments described herein, aft propulsion systems 610a, 610b, are fixedly attached proximate aft ends of booms 607a, 607b, aft of the wing 604 in hover mode and do not convert between hover mode (FIG. 6A) and cruise mode (FIG. 6B).

The position of rotor assemblies of propulsion systems 608a, 608b, 612a, 612b, as well as the pitch of individual rotor blades of all of the propulsion systems 608a, 608b, 610a, 610b, 612a, 612b, can be selectively controlled in order to selectively control direction, thrust, and lift of aircraft 600. As previously noted, propulsion systems 608a, 608b, 612a, 612b, are each convertible, relative to fuselage 602, between a vertical position, as shown in FIG. 6A, and a horizontal position, as shown in FIG. 6B. Propulsion systems 608a, 608b, 612a, 612b, are in the vertical position during vertical takeoff and landing mode. Vertical takeoff and landing mode may be considered to include hover operations of aircraft 600. Propulsion systems 608a, 608b, 612a, 612b, are in the horizontal position during forward flight mode, in which aircraft 600 is in forward flight. In forward flight mode, propulsion systems 608a, 608b, 612a, 612b, direct their respective thrusts in the aft direction to propel aircraft 600 forward. Aircraft 600 is operable to fly in all directions during the vertical takeoff and landing mode configuration of FIG. 6A, although faster forward flight is achievable while in the forward flight mode configuration of FIG. 6B. Propulsion systems 608a, 608b, 612a, 612b, may be tiltable between the vertical and horizontal positions by actuators (not shown) that are tiltable in response to commands originating from a pilot and/or a flight control system.

It should be noted that, although propulsion systems 608a, 608b, are shown and described as being tiltable between cruise and hover positions, those propulsion systems may be fixed in the hover positions, similarly to propulsion systems 610a, 610b.

In accordance with features of embodiments described herein, in certain embodiments, when aircraft 600 is in cruise mode, rotor assemblies of propulsion systems 610a, 610b, may cease rotation. In embodiments in which propulsion systems 608a, 608b, are also fixed (i.e., do not convert between hover and cruise modes), rotor assemblies thereof may also cease rotation when aircraft 600 is in cruise mode. Aircraft 600 is yet another configuration in which the hexrotor arc arrangement in hover is enabled without the use of boom supports. In this case, as shown in FIGS. 6A and 6B, supports extend radially from the wing centerline supporting the propulsion systems 608a, 608b, 610a, 610b. The central wing 604 adds on wing capability and rotor redundancy.

Figure 7A:
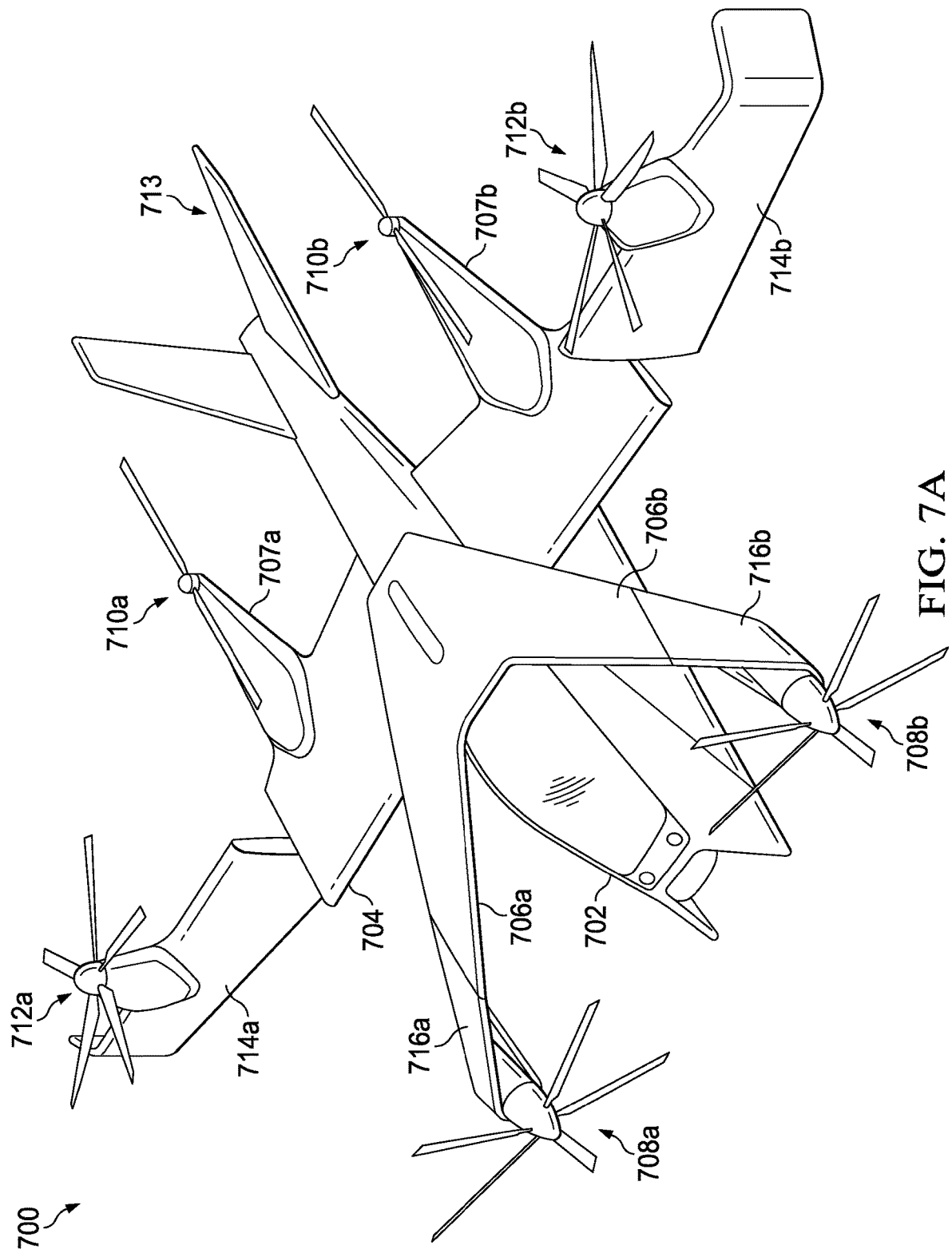
FIGS. 7A-7B illustrate another tiltrotor aircraft having a tilting hexrotor configuration in accordance with alternative embodiments described herein.
Figure 7B:
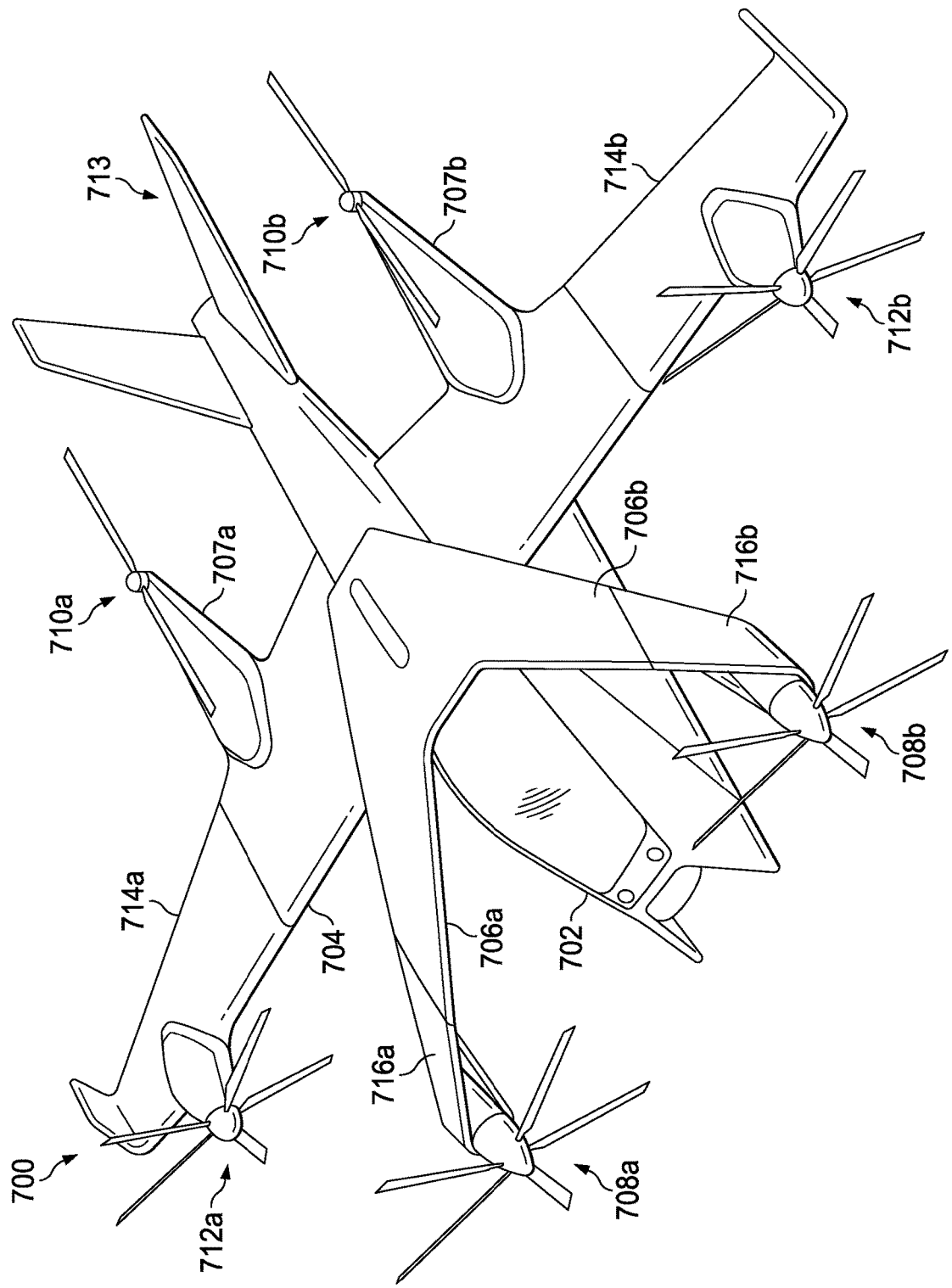

FIGS. 7A and 7B illustrate an example tiltrotor aircraft 700 that is convertible between a VTOL or hover (also commonly referred to as helicopter) mode (shown in FIG. 7A), which allows for vertical takeoff and landing, hovering, and low speed directional movement, and a cruise (also commonly referred to as airplane) mode (shown in FIG. 7B), which allows for forward flight as well as horizontal takeoff and landing. Aircraft 700 includes a fuselage 702, wing 704, a V-shaped boom assembly 706 comprising boom segments 706a, 706b, connected above the wing 704, and aft wing extensions 707A, 707A, connected to the wing on opposite sides of the fuselage 702. In accordance with features of embodiments described herein, aircraft further includes three pairs of propulsion systems, including a first pair of boom-mounted propulsion systems 708a, 708b, a pair of extension-mounted propulsion systems 710a, 710b, and a pair of wing-mounted propulsion systems 712a, 712b. Aircraft 700 further includes a tail assembly 713 at an aft end thereof.

In the illustrated embodiment, propulsion systems 712a, 712b, are tiltably connected to wing 704 proximate outboard ends thereof, while propulsion systems 708a, 708b, are tiltably connected to outboard ends of boom segments 706a, 706b, inboard of propulsion systems 712a, 712b. Propulsion systems 710a, 710b, are mounted to upper surfaces of outboard ends of wing extensions 707a, 707b.

Similar to the propulsion systems of aircraft 100, each of propulsion systems 708a, 708b, 710a, 710b, 712a, and 712b may include a drive system housing comprising a pylon, and a tiltable open rotor assembly comprising a plurality of rotor blades connected to a rotor mast and configured to rotate about a rotor axis. As shown in FIGS. 7A and 7B, the rotor assembly of each of propulsion systems 708a, 708b, 712a, 712b, includes five (5) rotor blades; however, it should be recognized that more or fewer blades may be implemented without departing from the spirit and the scope of the embodiments described. It should also be recognized that rotor assemblies of propulsion systems 708a, 708b, may include a different number of rotor blades than rotor assemblies of propulsion systems 712a, 712b. Rotation of rotor assemblies of propulsion systems 708a, 708b, 712a, and 712b generates lift while the aircraft 700 is operating in helicopter mode and thrust while the aircraft 700 is operating in airplane mode.

In the illustrated embodiment, each extension-mounted propulsion system 710a, 710b, includes a drive system housing comprising a pylon and a rotatable open rotor assembly comprising a plurality of rotor blades connected to a rotor mast and configured to rotate about a rotor axis. As shown in FIGS. 7A and 7B, each rotor assembly of propulsion systems 710a, 710b, includes two (2) rotor blades; however, it should be recognized that more or fewer blades may be implemented without departing from the spirit and the scope of the embodiments described. Rotation of rotor assemblies of propulsion systems 710a, 710b, generates lift while the aircraft 700 is operating in helicopter mode. It will be recognized that while rotor assemblies of propulsion systems 710a, 710b, are illustrated as being disposed above (i.e., on top of) wing extensions 707A, 707B, they may alternatively be disposed below (i.e., on the underside of) wing extensions.

In accordance with features of embodiments described herein, and as illustrated in FIGS. 7A and 7B, propulsion systems 712a, 712b, are connected to inboard ends of wing tips 714a, 714b, disposed on outboard ends of wing 704. Wing tips 714a, 714b, together with wing-mounted propulsion systems 712a, 712b, tilt relative to wing between a first position (FIG. 7A), in which propulsion systems 712a, 712b, and wing tips 714a, 714b, are configured in a hover mode, and a second position (FIG. 7B), in which propulsion systems 712a, 712b, and wing tips 714a, 714b, are configured in a cruise mode.

Similarly, propulsion systems 708a, 708b, are connected to boom tips 716a, 716b, disposed on outboard ends of boom segments 706a, 706b. Boom tips 716a, 716b, together with propulsion systems 708a, 708b, are tiltable relative to boom extensions 706a, 706b, between a first position (FIG. 7A), in which propulsion systems 708a, 708b, and boom tips 716a, 716b, are configured in a hover mode, and a second position (FIG. 7B), in which propulsion systems 708a, 708b, and boom tips 716a, 716b, are configured in a cruise mode. In accordance with features of embodiments described herein, aft propulsion systems 710a, 710b, are fixedly attached proximate aft ends of wing extensions 707a, 707b, aft of the wing 704 in hover mode and do not convert between hover mode (FIG. 7A) and cruise mode (FIG. 7B).

The position of rotor assemblies of propulsion systems 708a, 708b, 712a, 712b, as well as the pitch of individual rotor blades of all of the propulsion systems 708a, 708b, 710a, 710b, 712a, 712b, can be selectively controlled in order to selectively control direction, thrust, and lift of aircraft 700. As previously noted, propulsion systems 708a, 708b, 712a, 712b, are each convertible, relative to fuselage 702, between a vertical position, as shown in FIG. 7A, and a horizontal position, as shown in FIG. 7B. Propulsion systems 708a, 708b, 712a, 712b, are in the vertical position during vertical takeoff and landing mode. Vertical takeoff and landing mode may be considered to include hover operations of aircraft 700. Propulsion systems 708a, 708b, 712a, 712b, are in the horizontal position during forward flight mode, in which aircraft 700 is in forward flight. In forward flight mode, propulsion systems 708a, 708b, 712a, 712b, direct their respective thrusts in the aft direction to propel aircraft 700 forward. Aircraft 700 is operable to fly in all directions during the vertical takeoff and landing mode configuration of FIG. 7A, although faster forward flight is achievable while in the forward flight mode configuration of FIG. 7B. Propulsion systems 708a, 708b, 712a, 712b, may be tiltable between the vertical and horizontal positions by actuators (not shown) that are tiltable in response to commands originating from a pilot and/or a flight control system.

It should be noted that, although propulsion systems 708a, 708b, are shown and described as being tiltable between cruise and hover positions, those propulsion systems may be fixed in the hover positions, similarly to propulsion systems 710a, 710b.

In accordance with features of embodiments described herein, in certain embodiments, when aircraft 700 is in cruise mode, rotor assemblies of propulsion systems 710a, 710b, may cease rotation. In embodiments in which propulsion systems 708a, 708b, are also fixed (i.e., do not convert between hover and cruise modes), rotor assemblies thereof may also cease rotation when aircraft 700 is in cruise mode. Aircraft 700 is a hybrid of aircraft 500 (FIG. 5A-5B) and aircraft 600 (FIG. 6A-6B) in which propulsion assemblies 708a, 708b, are supported by airfoil shaped struts from the center of the wing (in a manner similar to aircraft 600), while the propulsion assemblies 710a, 710b, are supported by wing extensions aft (in a manner similar to aircraft 500).

Figure 8A:
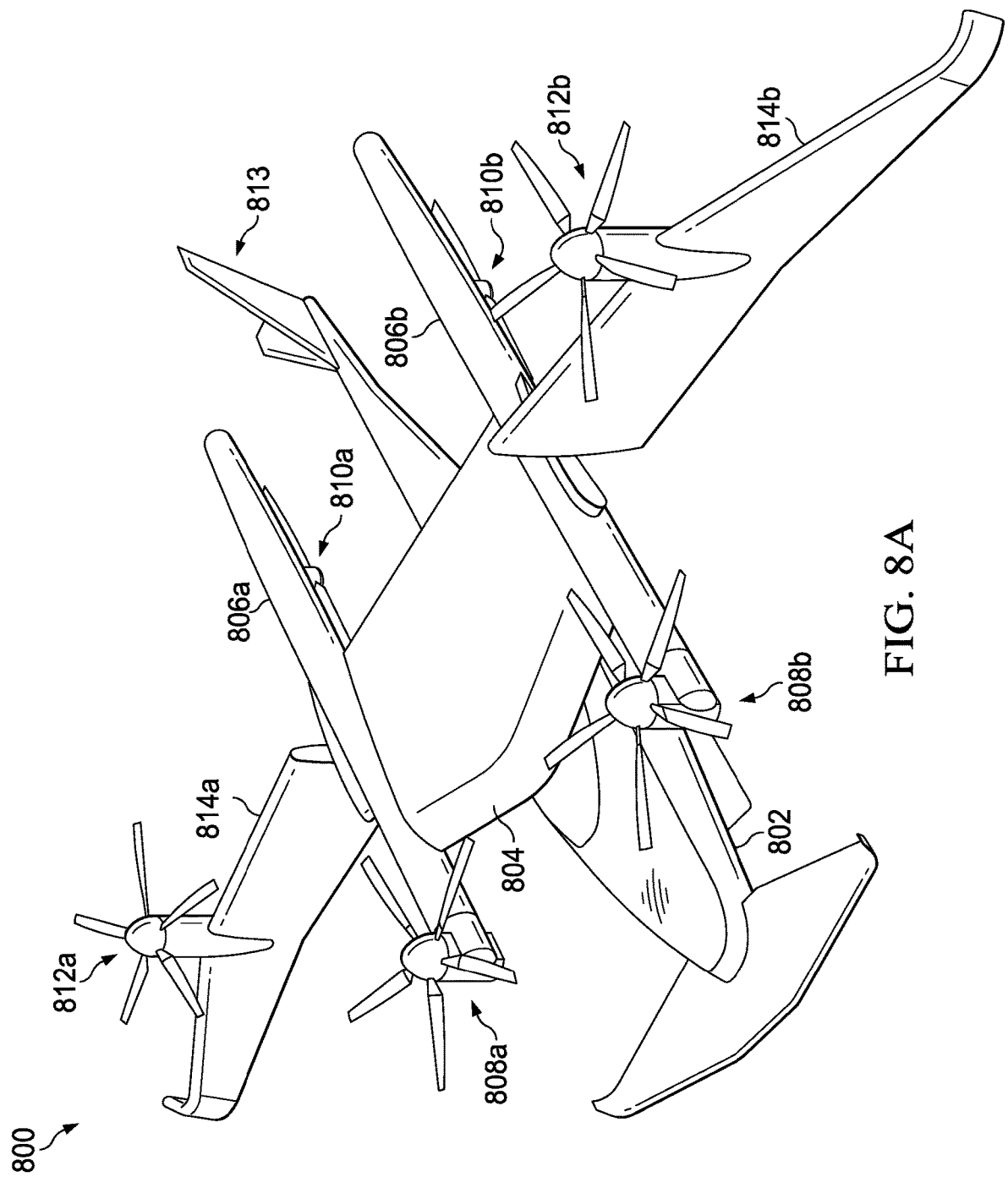
FIGS. 8A-8B illustrate another tiltrotor aircraft having a tilting hexrotor configuration in accordance with alternative embodiments described herein.
Figure 8B:
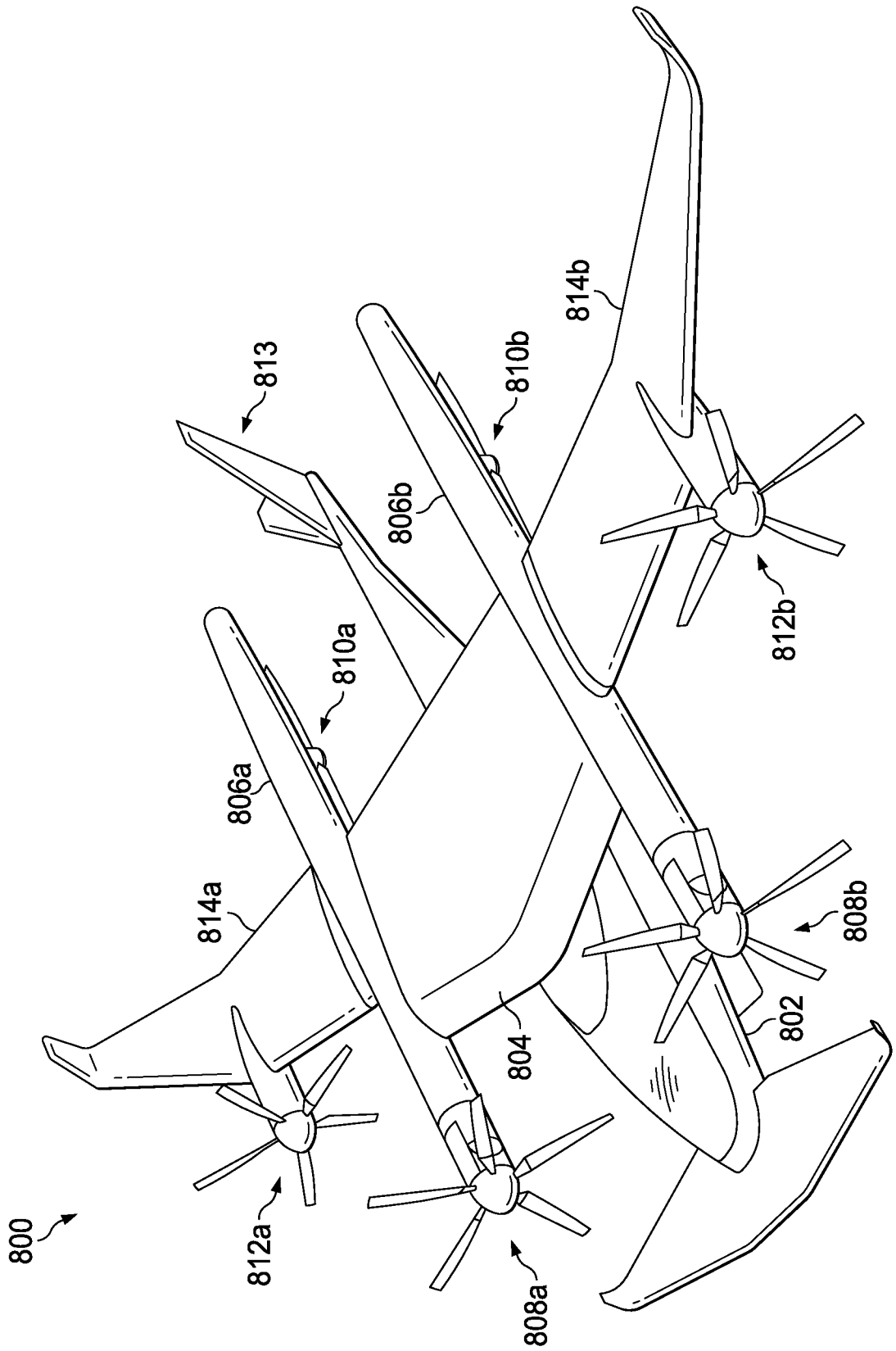

FIGS. 8A and 8B illustrate an example tiltrotor aircraft 800 that is convertible between a VTOL or hover (also commonly referred to as helicopter) mode (shown in FIG. 8A), which allows for vertical takeoff and landing, hovering, and low speed directional movement, and a cruise (also commonly referred to as airplane) mode (shown in FIG. 8B), which allows for forward flight as well as horizontal takeoff and landing. Aircraft 800 includes a fuselage 802, wing 804, and booms 806a, 806b, connected to the wing on opposite sides of the fuselage 802. In accordance with features of embodiments described herein, aircraft further includes three pairs of propulsion systems, including a first pair of wing-mounted propulsion systems 808a, 808b, a pair of boom-mounted propulsion systems 810a, 810b, and a second pair of wing-mounted propulsion systems 812a, 812b. Aircraft 800 further includes a tail assembly 813 at an aft end thereof.

In the illustrated embodiment, propulsion systems 812a, 812b, are tiltably connected to wing 804 proximate outboard ends thereof, while propulsion systems 808a, 808b, are tiltably connected to forward ends of booms 806a, 806b, inboard of propulsion systems 812a, 812b. Propulsion systems 810a, 810b, are mounted to upper surfaces proximate aft ends of booms 806a, 806b.

Similar to the propulsion systems of aircraft 100, each of propulsion systems 808a, 808b, 810a, 810b, 812a, and 812b may include a drive system housing comprising a pylon, and a rotatable open rotor assembly comprising a plurality of rotor blades connected to a rotor mast and configured to rotate about a rotor axis. As shown in FIGS. 8A and 8B, the rotor assembly of each of propulsion systems 808a, 808b, 812a, 812b, includes five (5) rotor blades; however, it should be recognized that more or fewer blades may be implemented without departing from the spirit and the scope of the embodiments described. It should also be recognized that rotor assemblies of propulsion systems 808a, 808b, may include a different number of rotor blades than rotor assemblies of propulsion systems 812a, 812b. Rotation of rotor assemblies of propulsion systems 808a, 808b, 812a, and 812b generates lift while the aircraft 800 is operating in helicopter mode and thrust while the aircraft 800 is operating in airplane mode.

In the illustrated embodiment, each propulsion system 810a, 810b, includes a drive system housing comprising a pylon and a rotatable open rotor assembly comprising a plurality of rotor blades connected to a rotor mast and configured to rotate about a rotor axis. As shown in FIGS. 8A and 8B, each rotor assembly of propulsion systems 810a, 810b, includes two (2) rotor blades; however, it should be recognized that more or fewer blades may be implemented without departing from the spirit and the scope of the embodiments described. Rotation of rotor assemblies of propulsion systems 810a, 810b, generates lift while the aircraft 800 is operating in helicopter mode. It will be recognized that while rotor assemblies of propulsion systems 810a, 810b, are illustrated as being disposed above (i.e., on top of) booms 808A, 808B, they may alternatively be disposed below (i.e., on the underside of) booms.

In accordance with features of embodiments described herein, and as illustrated in FIGS. 8A and 8B, propulsion systems 812a, 812b, are connected to inboard ends of wing tips 814a, 814b, disposed on outboard ends of wing 804. Wing tips 814a, 814b, together with wing-mounted propulsion systems 812a, 812b, tilt relative to wing between a first position (FIG. 8A), in which propulsion systems 812a, 812b, and wing tips 814a, 814b, are configured in a hover mode, and a second position (FIG. 8B), in which propulsion systems 812a, 812b, and wing tips 814a, 814b, are configured in a cruise mode.

Similarly, propulsion systems 808a, 808b, are connected to forward ends of booms 806a, 806b. Propulsion systems 808a, 808b, are tiltable relative to booms 806a, 806b, between a first position (FIG. 8A), in which propulsion systems 808a, 808b, are configured in a hover mode, and a second position (FIG. 8B), in which propulsion systems 808a, 808b, are configured in a cruise mode. In accordance with features of embodiments described herein, aft propulsion systems 810a, 810b, are fixedly attached to booms 806a, 806b, proximate aft ends thereof in hover mode and do not convert between hover mode (FIG. 8A) and cruise mode (FIG. 8B).

The position of rotor assemblies of propulsion systems 808a, 808b, 812a, 812b, as well as the pitch of individual rotor blades of all of the propulsion systems 8081, 808b, 810a, 810b, 812a, 812b, can be selectively controlled in order to selectively control direction, thrust, and lift of aircraft 800. As previously noted, propulsion systems 808a, 808b, 812a, 812b, are each convertible, relative to fuselage 802, between a vertical position, as shown in FIG. 8A, and a horizontal position, as shown in FIG. 8B. Propulsion systems 808a, 808b, 812a, 812b, are in the vertical position during vertical takeoff and landing mode. Vertical takeoff and landing mode may be considered to include hover operations of aircraft 800. Propulsion systems 808a, 808b, 812a, 812b, are in the horizontal position during forward flight mode, in which aircraft 800 is in forward flight. In forward flight mode, propulsion systems 808a, 808b, 812a, 812b, direct their respective thrusts in the aft direction to propel aircraft 800 forward. Aircraft 800 is operable to fly in all directions during the vertical takeoff and landing mode configuration of FIG. 8A, although faster forward flight is achievable while in the forward flight mode configuration of FIG. 8B. Propulsion systems 808a, 808b, 812a, 812b, may be tiltable between the vertical and horizontal positions by actuators (not shown) that are tiltable in response to commands originating from a pilot and/or a flight control system.

It should be noted that, although propulsion systems 808a, 808b, are shown and described as being tiltable between cruise and hover positions, those propulsion systems may be fixed in the hover positions, similarly to propulsion systems 810a, 810b.

In accordance with features of embodiments described herein, in certain embodiments, when aircraft 800 is in cruise mode, rotor assemblies of propulsion systems 810a, 810b, may cease rotation. In embodiments in which propulsion systems 808a, 808b, are also fixed (i.e., do not convert between hover and cruise modes), rotor assemblies thereof may also cease rotation when aircraft 800 is in cruise mode. Aircraft 800 incorporates a twin boom option in which the boom terminates with forming the tail, thereby reducing tail complexity while increasing tail options.

Figure 9A:
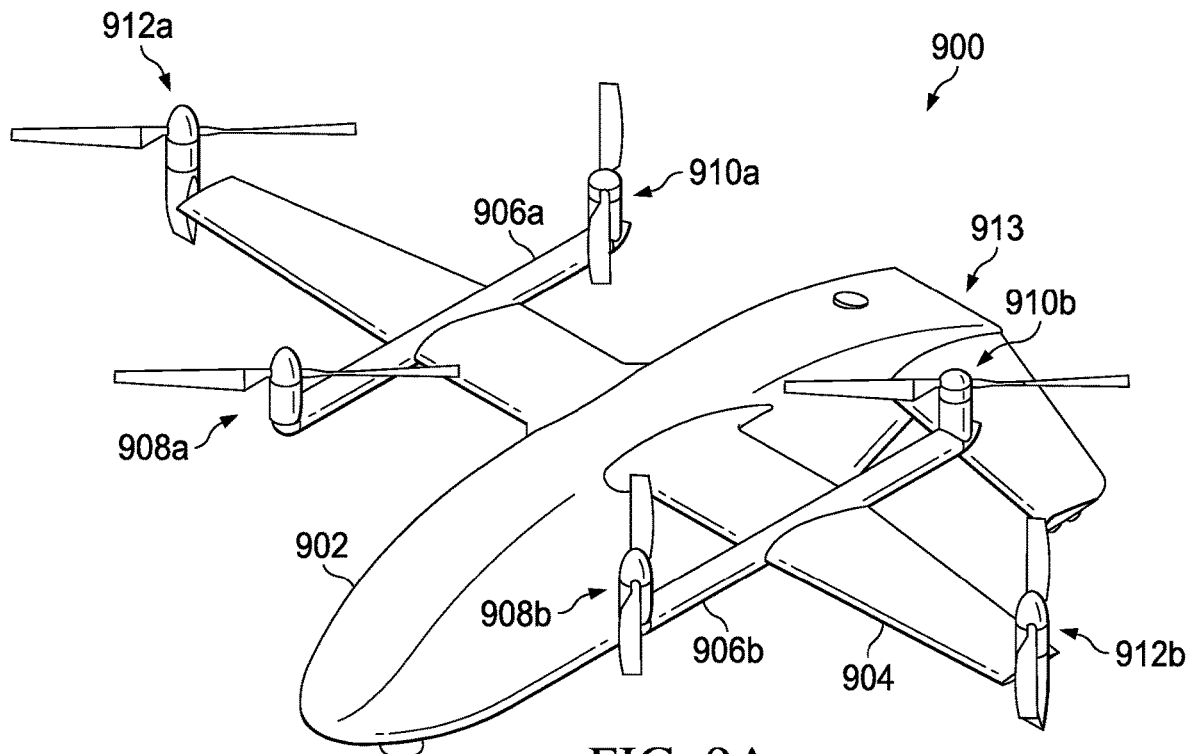
FIGS. 9A-9B illustrate another tiltrotor aircraft having a tilting hexrotor configuration in accordance with alternative embodiments described herein.
Figure 9B:
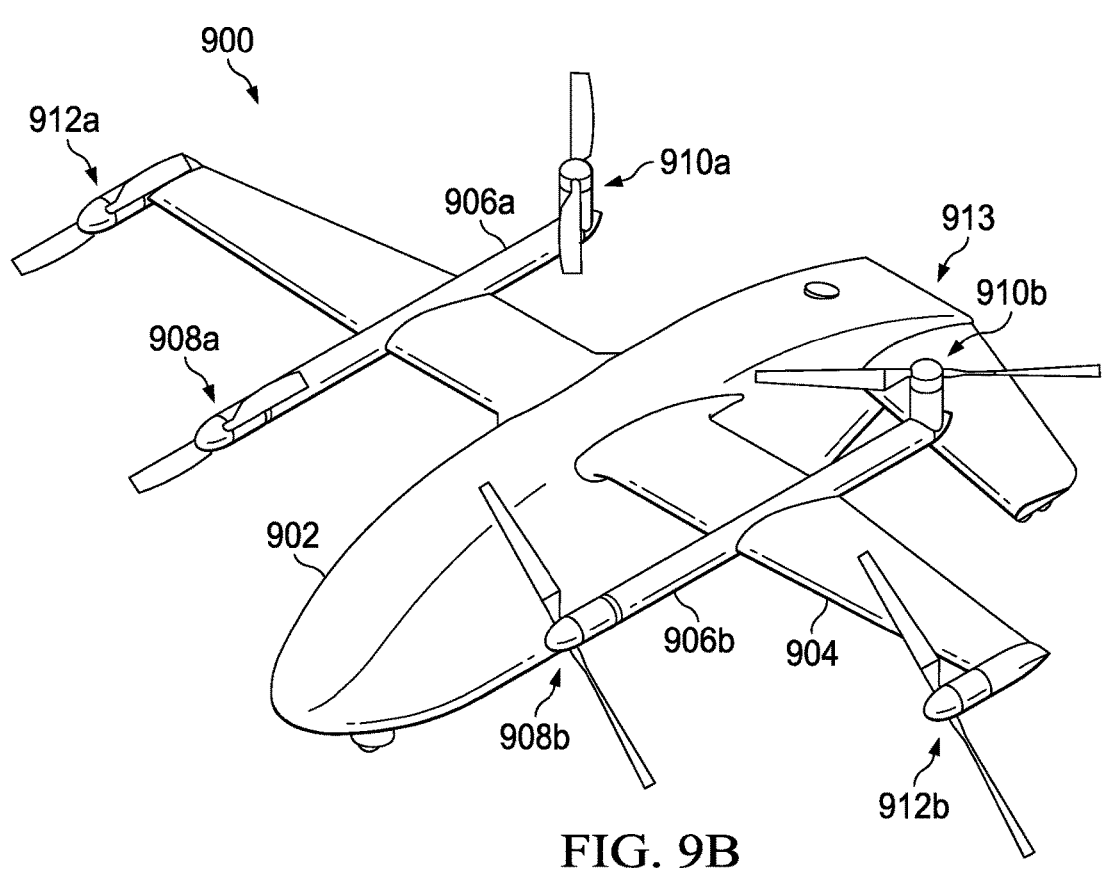

FIGS. 9A and 9B illustrate an example tiltrotor aircraft 900 that is convertible between a VTOL or hover (also commonly referred to as helicopter) mode (shown in FIG. 9A), which allows for vertical takeoff and landing, hovering, and low speed directional movement, and a cruise (also commonly referred to as airplane) mode (shown in FIG. 9B), which allows for forward flight as well as horizontal takeoff and landing. Aircraft 900 includes a fuselage 902, wing 904, and booms 906a, 906b, connected to the wing on opposite sides of the fuselage 902. In accordance with features of embodiments described herein, aircraft further includes three pairs of propulsion systems, including a pair of forward propulsion systems 908a, 908b, a pair of aft propulsion systems 910a, 910b, and a pair of wing-mounted propulsion systems 912a, 912b. In the illustrated embodiment, propulsion systems 912a, 912b, are tiltably connected to the outboard ends of wing 904, while propulsion systems 908a, 908b, are tiltably connected to the forward ends of booms 906a, 906b, inboard of propulsion systems 912a, 912b. Propulsion systems 910a, 910b, are mounted to upper surfaces of aft ends of booms 906a, 906b. Aircraft 900 further includes a tail assembly 913 at an aft end thereof.

Similar to the propulsion systems of aircraft 100, each of propulsion systems 908a, 908b, 910a, 910b, 912a, and 912b may include a drive system housing comprising a pylon, and a rotatable open rotor assembly comprising a plurality of rotor blades connected to a rotor mast and configured to rotate about a rotor axis. As shown in FIGS. 9A and 9B, the rotor assembly of each of propulsion systems 908a, 908b, 912a, 912b, includes five (5) rotor blades; however, it should be recognized that more or fewer blades may be implemented without departing from the spirit and the scope of the embodiments described. It should also be recognized that rotor assemblies of propulsion systems 909A, 909B, may include a different number of rotor blades than rotor assemblies of propulsion systems 912a, 912b. Rotation of rotor assemblies of propulsion systems 908a, 908b, 912a, and 912b generates lift while the aircraft 900 is operating in helicopter mode and thrust while the aircraft 900 is operating in airplane mode.

In the illustrated embodiment, each aft propulsion system 910a, 910b, includes a drive system housing comprising a pylon and a rotatable open rotor assembly comprising a plurality of rotor blades connected to a rotor mast and configured to rotate about a rotor axis. As shown in FIGS. 9A and 9B, each rotor assembly of propulsion systems 910a, 910b, includes two (2) rotor blades; however, it should be recognized that more or fewer blades may be implemented without departing from the spirit and the scope of the embodiments described. Rotation of rotor assemblies of propulsion systems 910a, 910b, generates lift while the aircraft 900 is operating in helicopter mode. It will be recognized that while rotor assemblies of propulsion systems 910a, 910b, are illustrated as being disposed above (i.e., on top of) booms 906a, 906b, they may alternatively be disposed below (i.e., on the underside of) booms.

In accordance with features of embodiments described herein, and as illustrated in FIGS. 9A and 9B, propulsion systems 908a, 908b, 909B, 912a, 912b, are tiltably connected to the wing 904 and tilt relative to wing between a first position (FIG. 9A), in which propulsion systems 908a, 908b, 912a, 912b, are configured in a hover mode, and a second position (FIG. 9B), in which propulsion systems 908a, 908b, 912a, 912b, are configured in a cruise mode. In accordance with features of embodiments described herein, aft propulsion systems 910a, 910b, are fixedly attached to booms 906a, 906b, aft of the wing 904 in hover mode and do not convert between hover mode (FIG. 9A) and cruise mode (FIG. 9B).

The position of rotor assemblies of propulsion systems 908a, 908b, 912a, 912b, as well as the pitch of individual rotor blades of all of the propulsion systems 908a, 908b, 910a, 910b, 912a, 912b, can be selectively controlled in order to selectively control direction, thrust, and lift of aircraft 900. As previously noted, propulsion systems 908a, 908b, 912a, 912b, are each convertible, relative to fuselage 902, between a vertical position, as shown in FIG. 9A, and a horizontal position, as shown in FIG. 9B. Propulsion systems 908a, 908b, 912a, 912b, are in the vertical position during vertical takeoff and landing mode. Vertical takeoff and landing mode may be considered to include hover operations of aircraft 900. Propulsion systems 908a, 908b, 912a, 912b, are in the horizontal position during forward flight mode, in which aircraft 900 is in forward flight. In forward flight mode, propulsion systems 908a, 908b, 912a, 912b, direct their respective thrusts in the aft direction to propel aircraft 900 forward. Aircraft 900 is operable to fly in all directions during the vertical takeoff and landing mode configuration of FIG. 9A, although faster forward flight is achievable while in the forward flight mode configuration of FIG. 9B. Propulsion systems 908a, 908b, 912a, 912b, may be tiltable between the vertical and horizontal positions by actuators (not shown) that are tiltable in response to commands originating from a pilot and/or a flight control system.

It should be noted that, although propulsion systems 908a, 908b, are shown and described as being tiltable between cruise and hover positions, those propulsion systems may be fixed in the hover positions, similarly to propulsion systems 910a, 910b.

In accordance with features of embodiments described herein, in certain embodiments, when aircraft 900 is in cruise mode, rotor assemblies of propulsion systems 910a, 910b, may cease rotation. In embodiments in which propulsion systems 908a, 908b, are also fixed (i.e., do not convert between hover and cruise modes), rotor assemblies thereof may also cease rotation when aircraft 900 is in cruise mode. Aircraft 900 is a simpler unmanned aerial vehicle (UAV) version of aircraft 400 and aircraft 800 suitable for unmanned logistics. Rotor complexity or propulsion assemblies is reduced and the booms are truncated, allowing the tail assembly 913b to also function as part of the landing gear. A nosewheel 920 is also provided under the fuselage 902.

Figure 10:
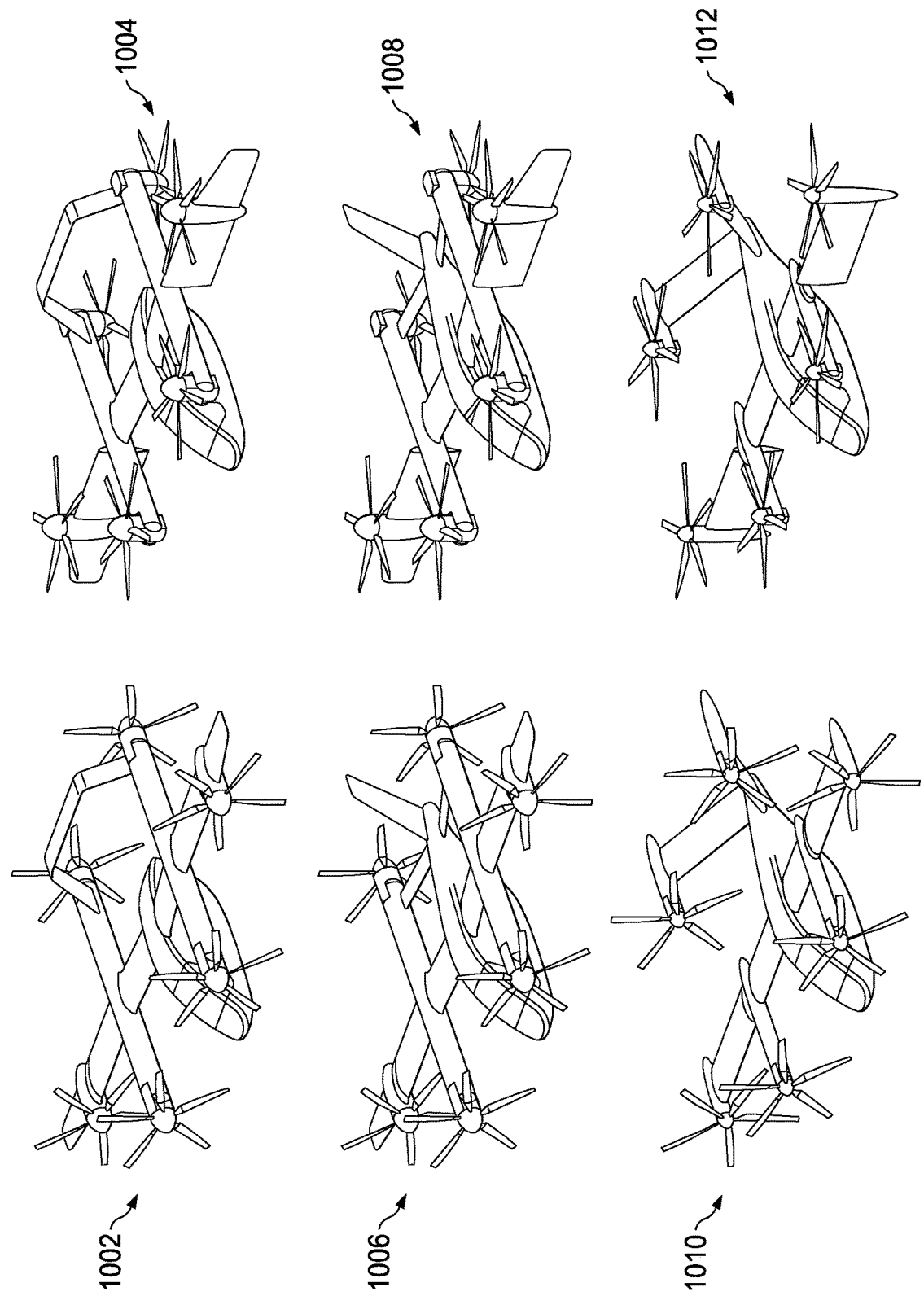
FIG. 10 illustrates other tiltrotor aircraft tilting hexrotor configurations in accordance with alternative embodiments described herein.

FIG. 10 illustrates other tiltrotor aircraft tilting hexrotor configurations in accordance with alternative embodiments described herein. In particular, FIG. 10 illustrates embodiments in which the aft rotors rotate down for hover 1004 and 1008 and up into a pusher configuration for cruise 1002 and 1006. FIG. 10 further illustrates a configuration in which a rotating aft rotor is part of a v-tail arrangement 1010 and 1012. All of the configurations shown in FIG. 10 represent variations of achieving a hexrotor arc arrangement in hover while allowing six rotors to provide propulsion in cruise.

Figure 11:
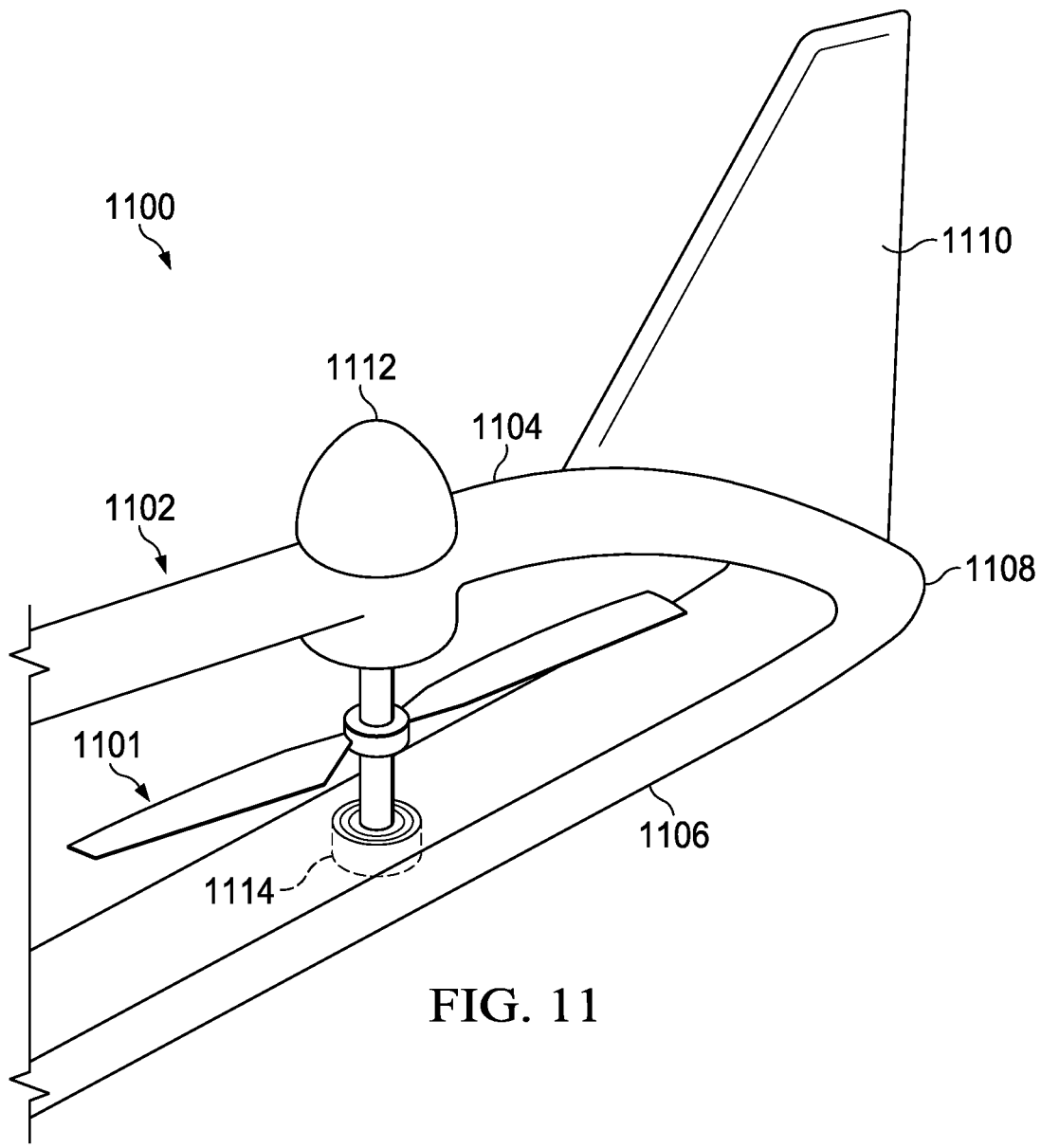
FIG. 11 illustrates an alternative arrangement for a boom-mounted propulsion system for an aircraft in accordance with embodiments described herein.

FIG. 11 illustrates an alternative arrangement for a boom-mounted propulsion system for an aircraft in accordance with embodiments described herein. As shown in FIG. 11, a boom-mounted propulsion system 1100 including a rotor assembly 1101 may be embedded within a boom 1102 between an upper boom portion 1104 and a lower boom portion 1106 connected by a boom closeout portion 1108. In the illustrated embodiment, the propulsion system 1100 is an aft propulsion system mounted proximate a tail assembly 1110. As shown in FIG. 11, a motor/drive fairing 1112 for the propulsion system 1100 is associated with the upper boom portion 1104 and a bearing 1114 is provided on an inside surface of the lower boom portion 1106 below the rotor assembly 1101 of the propulsion system 1100. Advantages of the configuration shown in FIG. 11 include reducing the drag of the stopped rotor assembly over configurations in which the rotor blades are exposed. It will be noted that in alternative embodiments, the motor/drive fairing 1112 may be associated with the lower boom portion 1106, in which case the bearing 1116 would be disposed on a lower surface of the upper boom portion 1104.

It should be appreciated that aircraft illustrated herein, such as aircraft 100, is merely illustrative of a variety of aircraft that can implement the embodiments disclosed herein. Indeed, the various embodiments of the electric drive system line replaceable unit described herein may be used on any aircraft that utilizes motors. Other aircraft implementations can include hybrid aircraft, tiltrotor aircraft, quad tiltrotor aircraft, unmanned aircraft, gyrocopters, airplanes, helicopters, commuter aircraft, electric aircraft, hybrid-electric aircraft, and the like. As such, those skilled in the art will recognize that the embodiments described herein for an electric drive system line replaceable unit can be integrated into a variety of aircraft configurations. It should be appreciated that even though aircraft are particularly well-suited to implement the embodiments of the present disclosure, non-aircraft vehicles and devices can also implement the embodiments.

The components of rotor assemblies described herein may comprise any materials suitable for use with an aircraft rotor. For example, rotor blades and other components may comprise carbon fiber, fiberglass, or aluminum; and rotor masts and other components may comprise steel or titanium.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: $R=Rl+k*(Ru-Rl)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

The diagrams in the FIGURES illustrate the architecture, functionality, and/or operation of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in "one embodiment", "example embodiment", "an embodiment", "another embodiment", "certain embodiments", "some embodiments", "various embodiments", "other embodiments", "alternative embodiment", and the like are intended to mean that any such features are included in one or more embodiments of the present disclosure but may or may not necessarily be combined in the same embodiments.

As used herein, unless expressly stated to the contrary, use of the phrase "at least one of", "one or more of" and "and/or" are open ended expressions that are both conjunctive and disjunctive in operation for any combination of named elements, conditions, or activities. For example, each of the expressions "at least one of X, Y and Z", "at least one of X, Y or Z", "one or more of X, Y and Z", "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first", "second", "third", etc., are intended to distinguish the particular nouns (e.g., blade, rotor, element, device, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of", "one or more of", and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. An aircraft comprising:
a fuselage;
a wing connected to the fuselage;
first and second booms connected to the wing on opposite sides of the fuselage;
no more than six propulsion systems, the propulsion systems including:
first and second forward propulsion systems tiltably connected to forward ends of the first and second booms such that the first and second forward propulsion systems are tiltable between a first position when the aircraft is in a hover mode in which the first and second forward propulsion systems rotate in a horizontal plane and a second position when the aircraft is in a cruise mode;
first and second aft propulsion systems fixedly attached proximate aft ends of the first and second booms, wherein each of the aft propulsions systems is angled outboard from a top surface of the one of the booms to which it is attached such that an axis of rotation of the aft propulsion system forms a non-zero angle outboard from a vertical axis; and
first and second wing-mounted propulsion systems connected to outboard ends of wings;
wherein the first and second wing-mounted propulsion systems are tiltable between a first position when the aircraft is in the hover mode and a second position when the aircraft is in the cruise mode;
wherein each of the first and second aft propulsion systems includes a rotor mast and a fairing configured to surround the rotor mast;
wherein each of a height of the fairings relative to a radius of the aft propulsion systems and a width of the fairings relative to a width of the booms is configured to minimize rotor-boom noise; and
wherein each of the propulsion systems includes a rotor assembly comprising a plurality of rotor blades.

2. The aircraft of claim 1, wherein the rotor assemblies of the first and second aft propulsion systems rotate when the aircraft is in the hover mode and cease to rotate when the aircraft is in the cruise mode.

3. The aircraft of claim 1, wherein the rotor assemblies of the first and second forward propulsion systems rotate when the aircraft is in the hover mode and cease to rotate when the aircraft is in the cruise mode.

4. The aircraft of claim 1, wherein the rotor assemblies of the forward propulsion systems and the wing-mounted propulsion systems include an identical number of blades.

5. The aircraft of claim 4, wherein the rotor assemblies of the aft rotor propulsion systems include fewer blades than the rotor assemblies of the forward propulsion systems and the wing-mounted propulsion systems.

6. The aircraft of claim 1, wherein the rotor assemblies of the forward propulsion systems and the wing-mounted propulsion systems include five blades each and the rotor assemblies of the aft rotor propulsion systems include two blades each.

7. The aircraft of claim 1, wherein the wing is disposed on a top surface of the fuselage.

8. The aircraft of claim 1, wherein a portion of each of the booms is integrated into the wing.

9. The aircraft of claim 1, wherein the propulsion systems collectively comprise a hexrotor arc when the aircraft is in the hover mode.

10. The aircraft of claim 1, wherein the first and second forward propulsion systems are located forward of the first and second wing-mounted propulsion systems.

11. The aircraft of claim 1, wherein the first and second wing-mounted propulsion systems are located outboard of the first and second forward propulsion systems.

12. The aircraft of claim 1, wherein the first and second aft propulsion systems are attached to a top surface of the first and second booms such that the rotor assemblies rotate above the first and second booms.

13. An electric vertical takeoff and landing aircraft (eVTOL) selectively convertible between a hover mode and a cruise mode, the eVTOL comprising:
- a fuselage;
- a wing connected to the fuselage and having opposite outboard ends;
- first and second booms connected to the wing on opposite sides of the fuselage and including forward ends disposed forward of the wing and aft ends disposed aft of the wing; and
- a propulsion arrangement for propelling the aircraft, the propulsion arrangement comprising no more than six propulsion systems, the no more than six propulsion systems comprising:
  - first and second forward propulsion systems attached to the forward ends of the first and second booms;
  - first and second aft propulsion systems fixedly attached proximate the aft ends of the first and second booms, wherein each of the first and second aft propulsion systems includes a rotor mast for supporting a rotor assembly of the aft propulsion system and a fairing configured to surround the rotor mast between the rotor assembly and the respective one of the first and second booms, and wherein each of a height of the fairings relative to a radius of the aft propulsion systems and a width of the fairings relative to a width of the booms is configured to minimize rotor-boom noise; and
  - first and second wing-mounted propulsion systems connected to outboard ends of wings, wherein each of the first and second wing-mounted propulsion systems includes a pylon for housing a drive system;
- wherein each of the pylons is tiltable relative to the wing between a first position when the aircraft is in a hover mode and a second position when the aircraft is in a cruise mode.

14. The eVTOL of claim 13, wherein the first and second aft propulsion systems are operable when the aircraft is in the hover mode and inoperable when the aircraft is in the cruise mode.

15. The eVTOL of claim 13, wherein the first and second forward propulsion systems are tiltably connected to forward ends of the first and second booms such that the first and second forward propulsion systems are tiltable between a first position when the aircraft is in the hover mode and a second position when the aircraft is in the cruise mode.

16. The eVTOL of claim 13, wherein the first and second forward propulsion systems are fixedly attached to the forward ends of the first and second booms and wherein the first and second forward propulsion systems are operable when the aircraft is in the hover mode and inoperable when the aircraft is in the cruise mode.

17. The eVTOL of claim 13, wherein the propulsion systems collectively comprise a hexrotor arc when the aircraft is in the hover mode.

18. The eVTOL of claim 13, wherein the first and second aft propulsion systems are attached to a bottom surface of the first and second booms such that rotor assemblies of the first and second aft propulsion systems rotate below the first and second booms.

19. An electric vertical takeoff and landing aircraft (eVTOL) selectively convertible between a hover mode and a cruise mode, the eVTOL comprising:
- a fuselage;
- a wing connected to a top surface of the fuselage and having opposite outboard ends;
- first and second booms connected to the wing on opposite sides of the fuselage and including forward ends disposed forward of the wing and aft ends disposed aft of the wing;
- first and second forward propulsion systems attached to the forward ends of the first and second booms;
- first and second aft propulsion systems fixedly attached proximate the aft ends of the first and second booms, wherein each of the aft propulsions systems is angled outboard from a top surface of the one of the booms to which it is attached such that an axis of rotation of the aft propulsion system forms a non-zero angle outboard from a vertical axis; and
- first and second wing-mounted propulsion systems connected to outboard ends of wings, wherein each of the first and second wing-mounted propulsion systems includes a pylon for housing a drive system;
- wherein each of the pylons is tiltable relative to the wing between a first position when the aircraft is in a hover mode and a second position when the aircraft is in a cruise mode;
- wherein each of the first and second aft propulsion systems includes a rotor mast and a fairing configured to cover the rotor mast; and
- wherein each of a height of the fairings relative to a radius of the aft propulsion systems and a width of the fairings relative to a width of the booms is configured to minimize rotor-boom noise.

* * * * *